United States Patent [19]

Imamura

[11] Patent Number: 5,659,490
[45] Date of Patent: Aug. 19, 1997

[54] METHOD AND APPARATUS FOR GENERATING COLOR IMAGE MASK

[75] Inventor: Atsushi Imamura, Kyoto, Japan

[73] Assignee: Dainippon Screen Mfg. Co., Ltd., Japan

[21] Appl. No.: 466,598

[22] Filed: Jun. 6, 1995

[30] Foreign Application Priority Data

| Jun. 23, 1994 | [JP] | Japan | 6-165919 |
| Jun. 23, 1994 | [JP] | Japan | 6-165920 |
| Sep. 27, 1994 | [JP] | Japan | 6-258895 |
| Oct. 14, 1994 | [JP] | Japan | 6-275851 |
| Oct. 18, 1994 | [JP] | Japan | 6-280063 |

[51] Int. Cl.$^6$ ............................ H04N 1/62
[52] U.S. Cl. ............ 364/526; 358/500; 358/518; 382/164; 395/129
[58] Field of Search .................... 358/500, 518; 364/526; 382/164, 168, 272; 395/129

[56] References Cited

U.S. PATENT DOCUMENTS

| 5,016,173 | 5/1991 | Kenet et al. | 364/413.13 |
| 5,038,383 | 8/1991 | Usumoto et al. | 382/235 |
| 5,206,719 | 4/1993 | Ikeda et al. | 358/518 |
| 5,247,583 | 9/1993 | Kao et al. | 382/9 |
| 5,311,336 | 5/1994 | Kurita et al. | 382/164 |
| 5,454,050 | 9/1995 | Nakabayashi et al. | 382/171 |
| 5,475,507 | 12/1995 | Suzuki et al. | 358/500 |
| 5,485,557 | 1/1996 | Sato et al. | 395/129 |
| 5,539,523 | 7/1996 | Nakai et al. | 358/296 |

FOREIGN PATENT DOCUMENTS

| 441558 | 2/1991 | European Pat. Off. |
| 1-298477 | 12/1989 | Japan . |

*Primary Examiner*—Edward R. Cosimano
*Attorney, Agent, or Firm*—Ostrolenk, Faber, Gerb & Soffen, LLP

[57] ABSTRACT

A subject color and a non-subject color of a mask is specified, and a first color vector representing the subject color and a second color vector representing the non-subject color are determined. A third color vector is set to be linearly independent of the first and second color vectors. First through third coefficients are then determined for the first through third color vectors. Bit map data representing the distribution of the first coefficient is binarized to give binary mask data representing a mask. A mask area and a non-mask area are distinguishably displayed in the color image. Accordingly, the present invention will produce a mask area whose color is close to the subject color while excluding the non-subject color.

20 Claims, 28 Drawing Sheets

Fig. 1 (A) ORIGINAL COLOR IMAGE    Fig. 1 (B) 1ST MASK

THREE COLOR VECTORS IN RGB SPACE

HSV SPACE

DETERMINATION OF THIRD COLOR VECTOR V3

AUTOMATIC DETERMINATION OF THRESHOLD (No. 1)

AUTOMATIC DETERMINATION OF THRESHOLD (No. 2)

BINARIZATION WITH COEFFICIENT OF 1ST COLOR VECTOR

Fig. 16 (A) ONLY 1ST MASK AREAS ARE DISPLAYED IN COLOR
Fig. 16 (B) 2ND MASK
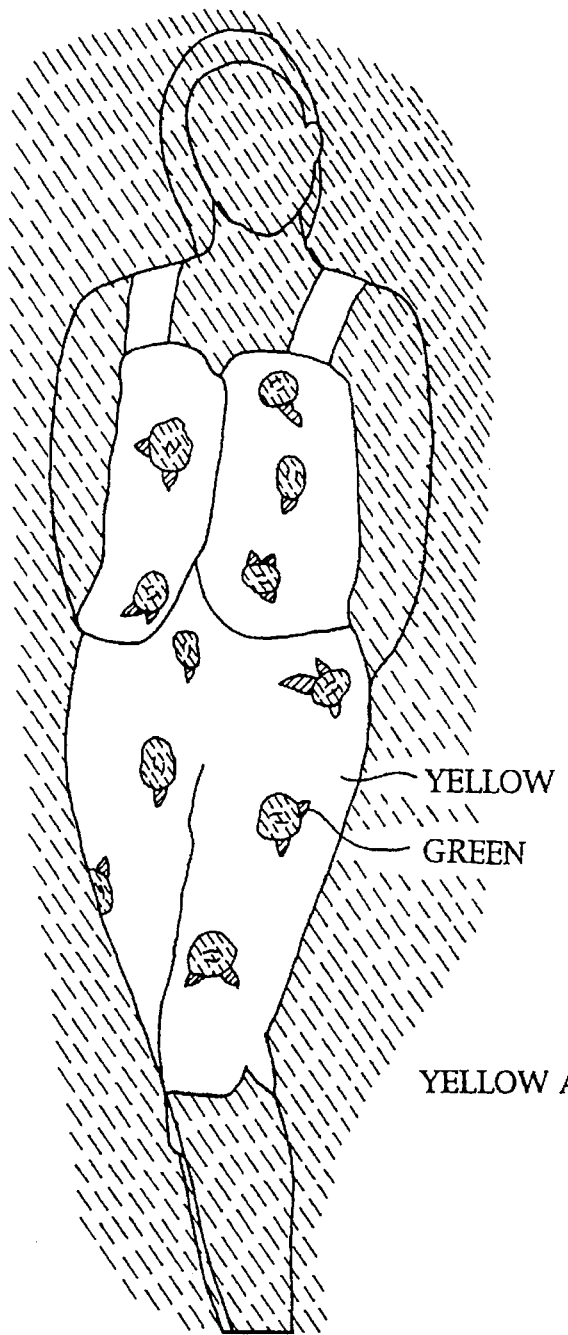
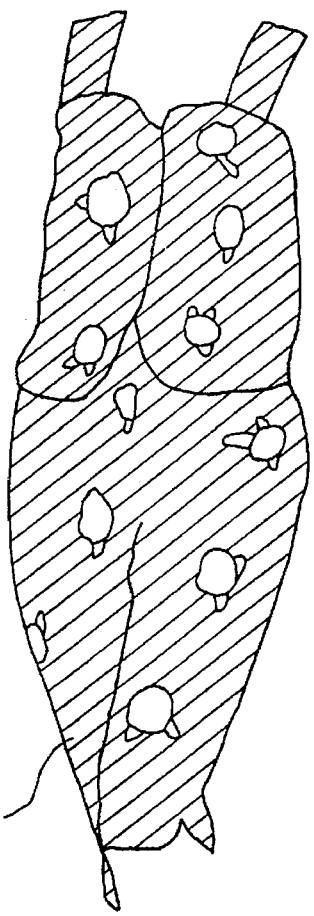

Fig. 18 (A) 1ST COLOR VECTOR $V_{Ai}$
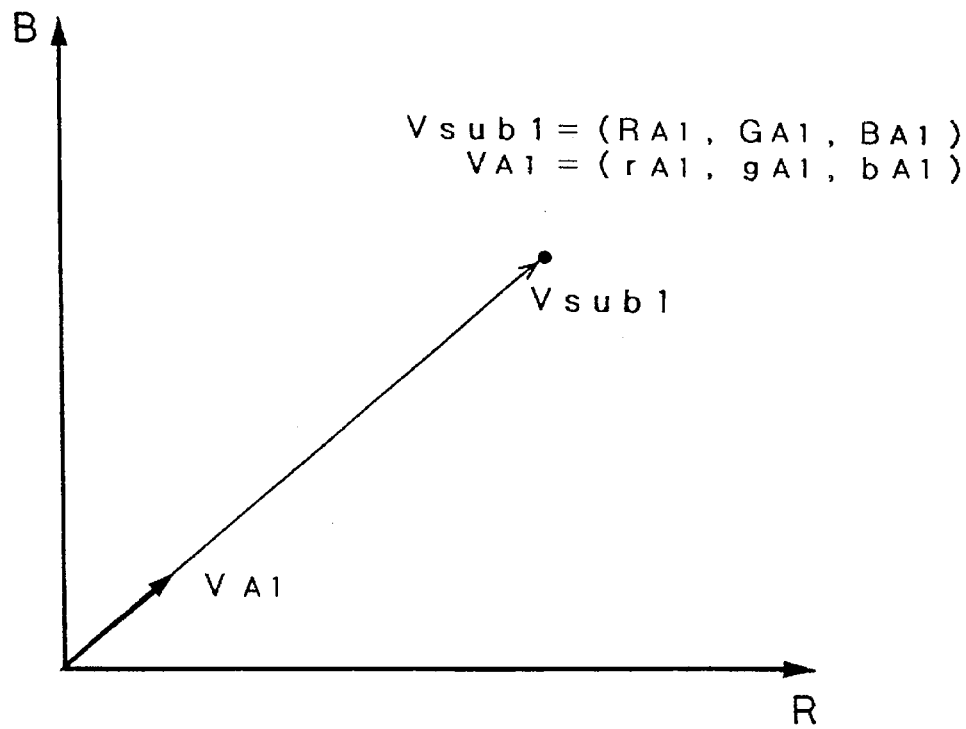
Fig. 18 (B) 2ND COLOR VECTOR $V_{Bj}$
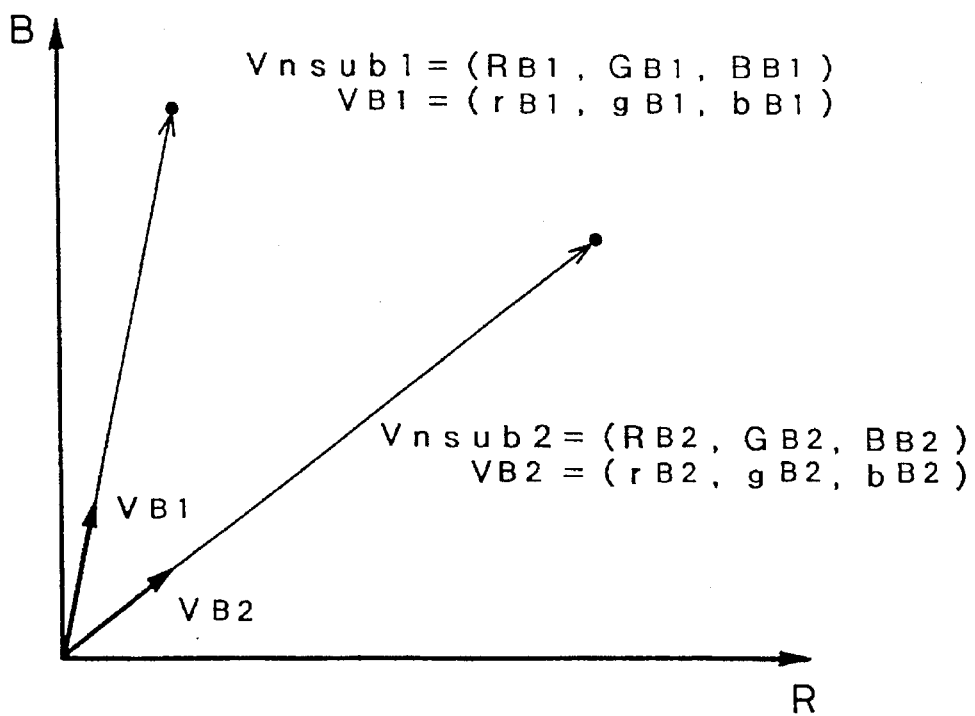

THREE COLOR VECTORS IN RGB SPACE

Fig. 21 PROCESS OF CALCULATING 1ST COEFFICIENT k1 AND MULTI-TONE MASK

1ST COEFFICIENTS k1(i,1) FOR PLURAL SUBJECT COLORS

1ST COEFFICIENTS k(1,j) FOR PLURAL NON-SUBJECT COLORS

PIXEL-SKIPPED IMAGE

COLOR PATCHES OF REPRESENTATIVE COLORS

DISPLAY ON MONITOR

COLOR GUIDE 60 AND PIXEL-SKIPPED IMAGE 70

ONLY MASK AREA IS DISPLAYED IN COLOR.

METHOD AND APPARATUS FOR GENERATING COLOR IMAGE MASK

BACKGROUND OF THE INVENTION

1. Field of the Invention

The present invention relates to a method of and an apparatus for generating mask data representing a mask area of a specific color in a color image.

2. Description of the Related Art

In prepress process, some image processing, such as color change or sharpness enhancement, are sometimes required only for an area of a specific color in an original color image such as a photograph. For example, only a color of clothes on a model is to be changed in some cases, and sharpness enhancement is to be executed in an area other than the flesh tint of the model in other cases. When a desired processing is executed (or not executed) only for an area of a specific color in the original color image, a cutout mask representing the specific color area is prepared.

FIGS. 1(A) and 1(B) illustrate an original color image and a desirable mask. The original color image shown in FIG. 1(A) is a photograph of a model with black hair in yellow cloths with rose patterns. The rose patterns include white and pink petals and green leaves surrounding the petals. FIG. 1(B) shows a mask including a yellow area and a green area of the clothes.

According to a conventional method of preparing a color mask by analyzing colors of a color image, colors of pixels in a possible mask area are analyzed to determine a primary component axis of the colors in a three dimensional color space. The pixels which have a greater component other than the primary component are to be excluded from the mask area. That is, when the color of a pixel is far from the primary component axis, the pixel is excluded from the mask area.

However, it is difficult for the conventional method to distinguish a flesh tint area from a yellow area because the flesh tint color has a considerable fraction of yellow component. Accordingly, it is difficult to produce the mask area as shown in FIG. 1(B), which includes an yellow area while excluding a flesh tint area of FIG. 1(A). Such problem is commonly observed when one of two colors having relatively close hues is specified as a mask area while the other color is to be excluded from the mask area.

SUMMARY OF THE INVENTION

An object of the invention is thus to produce a mask of a specific color while excluding another color close to the specific color.

The present invention is directed to a method of generating mask data representing a desired color area in a color image. The method comprises the steps of: (a) specifying n pieces of subject colors and m pieces of non-subject colors for defining the desired color area, where m and n are integers; (b) obtaining n pieces of first color vectors for the n pieces of subject color in a color space; (c) obtaining m pieces of second color vectors for the m pieces of non-subject colors in the color space; (d) forming n×m combinations of the first and second color vectors, and obtaining a third color vector linearly independent of the first and second color vectors with respect to each of the n×m combinations to form n×m sets of bases composed of the first through third color vectors; (e) expressing color of each pixel included in the color image by a linear combination of the first through third color vectors with respect to each of the n×m sets of bases, to thereby obtain first through third coefficients for the first through third color vectors with respect to each of the n×m sets of bases; and (f) generating the mask data as a function of the first coefficient obtained with respect to each of the n×m sets of bases.

The first coefficient is relatively large and the second coefficient is relatively small for an area whose color is close to the subject colors while the first coefficient is relatively small and the second coefficient is relatively large for another area whose color is close to the non-subject color. Even if the subject colors have a hue similar to those of the non-subject colors, mask data can be produced as a function of the first coefficient so that the mask data represents a mask area whose color is close to the subject colors while excluding another color area whose color is close to the non-subject colors.

In a preferred embodiment, the step (d) comprises the steps of: transforming each of the mxn combinations of the first and second color vectors to fourth and fifth color vectors in a hue/saturation/brightness space; and selecting a vector representing white in the color space as the third color vector when saturation components of the fourth and fifth color vectors are more than a predetermined value; and when a saturation component of at least one of the fourth and fifth color vectors is less than the predetermined value, rotating a hue component of one the fourth and fifth color vectors, whose saturation component is the greater, by a predetermined angle in the hue/saturation/brightness space to generate a sixth color vector and transforming the sixth color vector into the color space to generate the third color vector.

The step (f) comprises the step of: determining a value of the mask data for each pixel in the color image by the steps of: (1) determining a maximum of n pieces of first coefficients with respect to each pixel in the color image, the n pieces of first coefficients being obtained with respect to n pieces of bases which include an identical one of the m pieces of second color vectors, to thereby obtain m pieces of the maximums for the m pieces of second color vectors; (2) determining a minimum of the m pieces of the maximums with respect to each pixel in the color image; and (3) determining the value of the mask data for each pixel in the color image as a function of the minimum of the m pieces of the maximums.

The step (3) comprises the step of: binarizing the minimum with a threshold value to generate binary mask data.

The step of binarizing comprises the steps of: preparing a histogram showing frequency of the minimum in the color image; and determining a local minimum of the histogram as the threshold value.

In another preferred embodiment, each of the m and n is equal to one.

The step (f) comprises the step of: binarizing the first coefficient with a threshold value to generate binary mask data.

In still another embodiment, the method further comprises the steps of: (g) displaying a mask area represented by the mask data distinguishably from a non-mask area in the color image on a display device; and (i) executing the processing of the steps (a) through (g) on the mask area in the color image while specifying n' pieces of subject colors and m' pieces of non-subject colors at the step (a), to thereby generate second mask data representing a second mask area within the mask area.

Each of the m, m', n and n' is equal to one.

In another embodiment, the step (a) comprises the steps of: (1) obtaining statistical color distribution of the color image; (2) determining a plurality of representative colors of the color image from the statistical color distribution, and displaying the plurality of representative colors on a display device; and (3) selecting the n pieces of subject colors and the m pieces of non-subject colors from the plurality of representative colors displayed on the display device.

The above step (1) comprises the step of: dividing the color space into a plurality of divisional spaces; and obtaining a frequency of each of the plurality of divisional spaces within the color images as the statistical color distribution; and wherein the step (2) comprises the steps of: displaying the plurality of representative colors corresponding to at least part 6f the plurality of divisional spaces according to the frequency.

The step of dividing the color space comprises the steps of: obtaining three histogram for three color components of the color space concerning the color image; and finding local minimums for the three histograms, and setting the local minimums as borders of the plurality of divisional spaces.

In still another embodiment, the step (a) comprises the steps of: displaying a color selection image for selecting arbitrary color components on a display device; and specifying the n pieces of subject colors and the m pieces of non-subject colors while using the color selection image.

The method further comprising, between the steps (d) and (e), the steps of: (1) selecting at least one of the color selection image and a pixel-skipped image of the color image as a subject image; (2) expressing color of each pixel included in the subject image by a linear combination of the first through third color vectors with respect to each of the n×m sets of bases, to thereby obtain first through third coefficients for the first through third color vectors with respect to each of the n×m sets of bases; (3) generating preliminary mask data as a function of the first coefficient obtained with respect to each of the n×m sets of bases in the step (2) for each pixel included in the subject image; and (4) displaying a preliminary mask area represented by the preliminary mask data distinguishably from a preliminary non-mask area in the subject image on the display device.

The method further comprising the step of: repeatedly executing the processing of the steps (a) through (d) and (1) through (4) in response to a demand from a user while re-selecting the n pieces of subject colors and the m pieces of non-subject colors at the step (a).

The present invention is further directed to an apparatus for generating mask data representing a desired color area in a color image. The apparatus comprises: means for specifying n pieces of subject colors and m pieces of non-subject colors for defining the desired color area, where m and n are integers; means for obtaining n pieces of first color vectors for the n pieces of subject color in a color space; means for obtaining m pieces of second color vectors for the m pieces of non-subject colors in the color space; means for forming n×m combinations of the first and second color vectors, and obtaining a third color vector linearly independent of the first and second color vectors with respect to each of the n×m combinations to form n×m sets of bases from the first through third color vectors; means for expressing color of each pixel included in the color image by a linear combination of the first through third color vectors with respect to each of the n×m sets of bases, to thereby obtain first through third coefficients for the first through third color vectors with respect to each of the n×m sets of bases; means for generating the mask data as a function of the first coefficient obtained with respect to each of the n×m sets of bases.

These and other objects, features, aspects, and advantages of the present invention will become more apparent from the following detailed description of the preferred embodiments with the accompanying drawings.

BRIEF DESCRIPTION OF THE DRAWINGS

FIGS. 16(A) and 16(B) show display of a first mask area and a second mask;

FIGS. 18(A) and 18(B) show a first color vector $V_{Ai}$ and a second color vector $V_{Bj}$ in the second embodiment;

DESCRIPTION OF THE PREFERRED EMBODIMENT

A. First Embodiment

Figure 2:
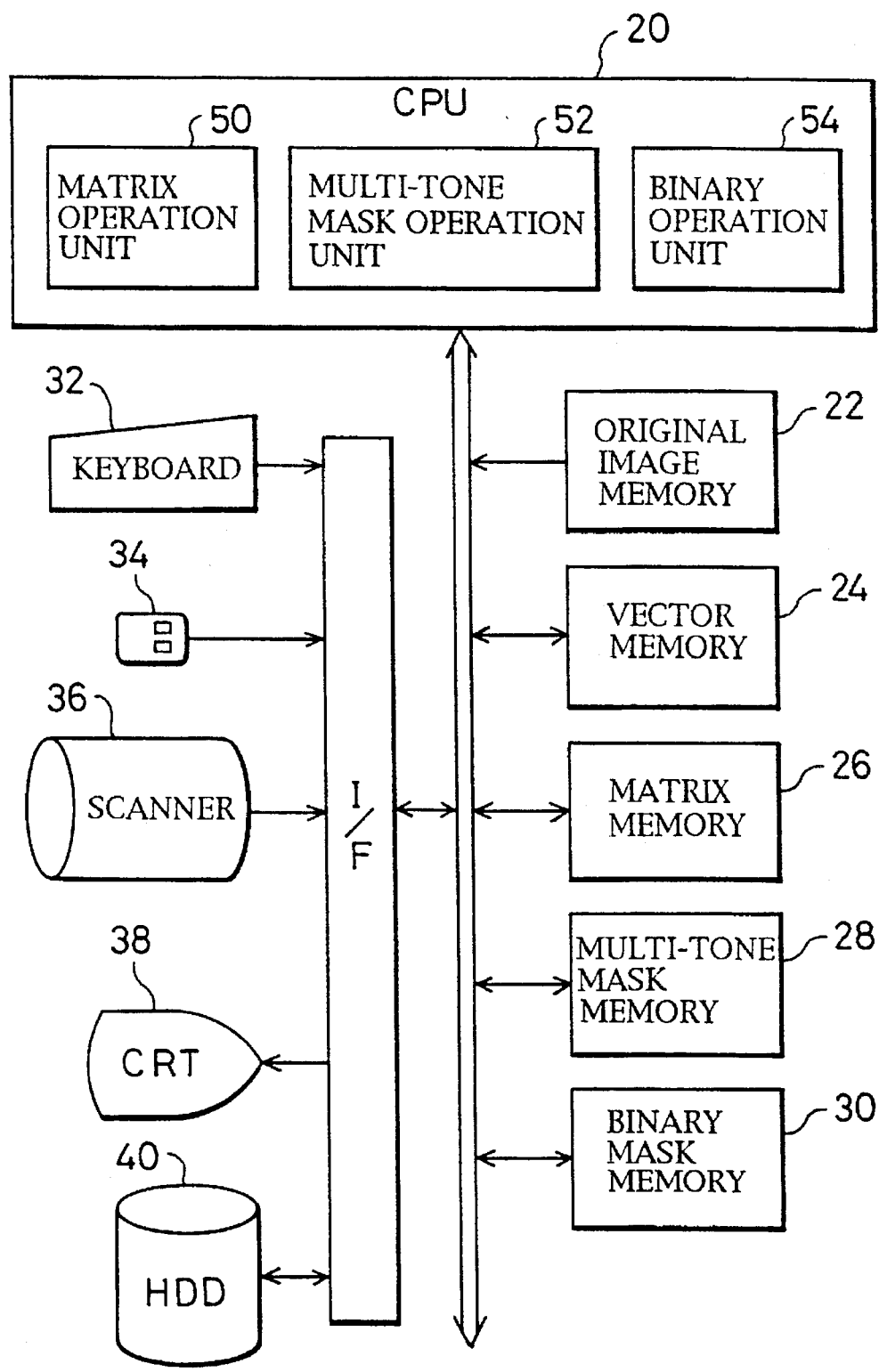
FIG. 2 is a block diagram illustrating a mask preparation system for preparing a cutout mask, embodying the invention.

FIG. 2 is a block diagram illustrating a mask preparation system for preparing a cutout mask, embodying the invention. The mask preparation system is constructed as a computer system including a CPU 20, an original image memory 22 for storing an original color image, a vector memory 24 for storing color vectors, a matrix memory 26 for storing matrix components as described later, a multi-tone mask memory 28 for storing multi-tone mask data, and a binary mask memory 30 for storing binary mask data. The system is further provided with a keyboard 32 and a mouse 34 functioning as input means or specification means, a scanner 36 as image input means, a color CRT 38 as display means, and a hard disk unit 40 as external storage means.

The CPU 20 implements functions of a matrix operation unit 50, a multi-tone mask operation unit 52, and a binary operation unit 54 by executing software programs stored in a RAM (not shown). The functions of these units will be described later in detail.

Figure 1:
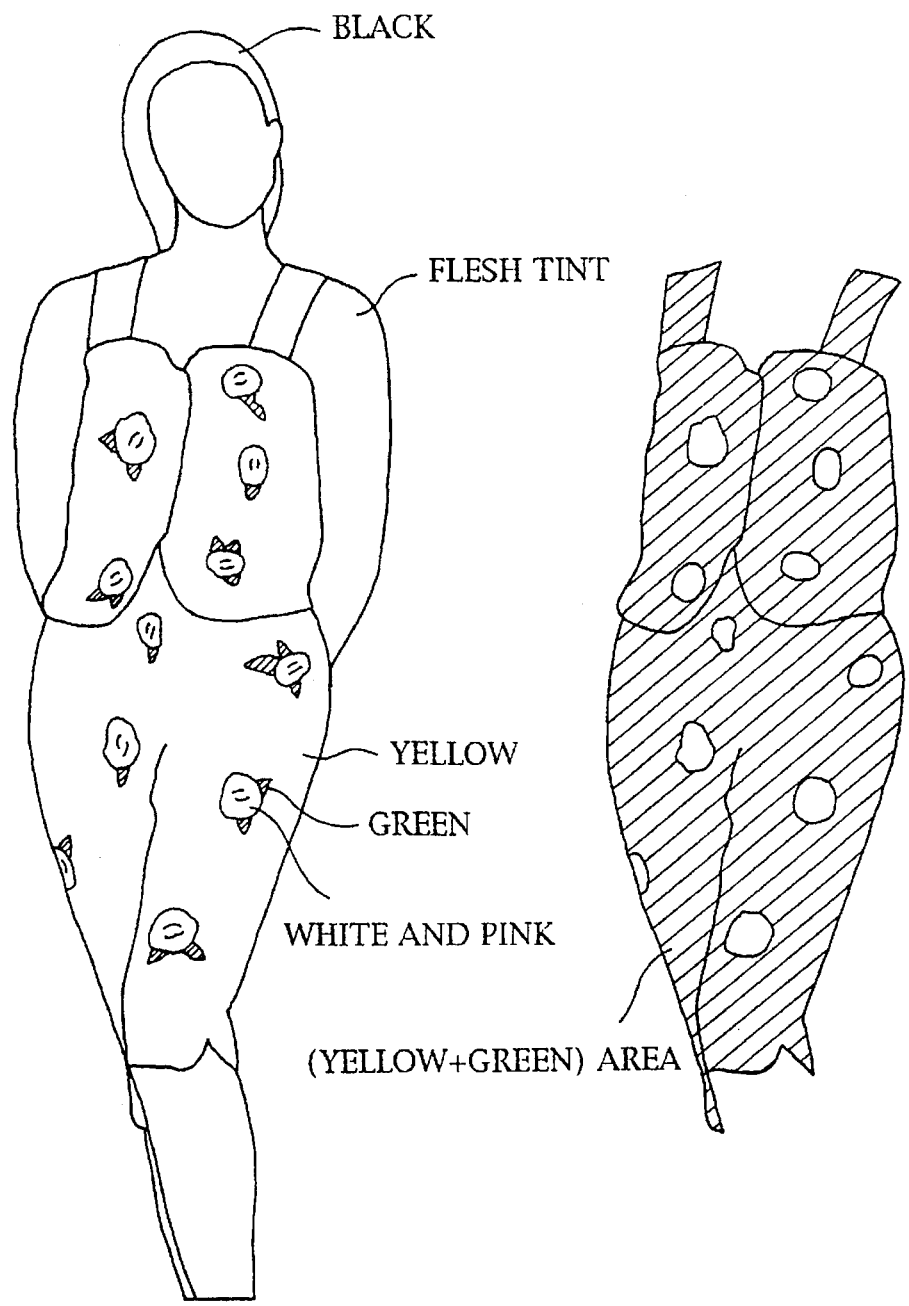
FIGS. 1(A) and 1(B) show an original color photograph and a mask applied to the original.
Figure 3:
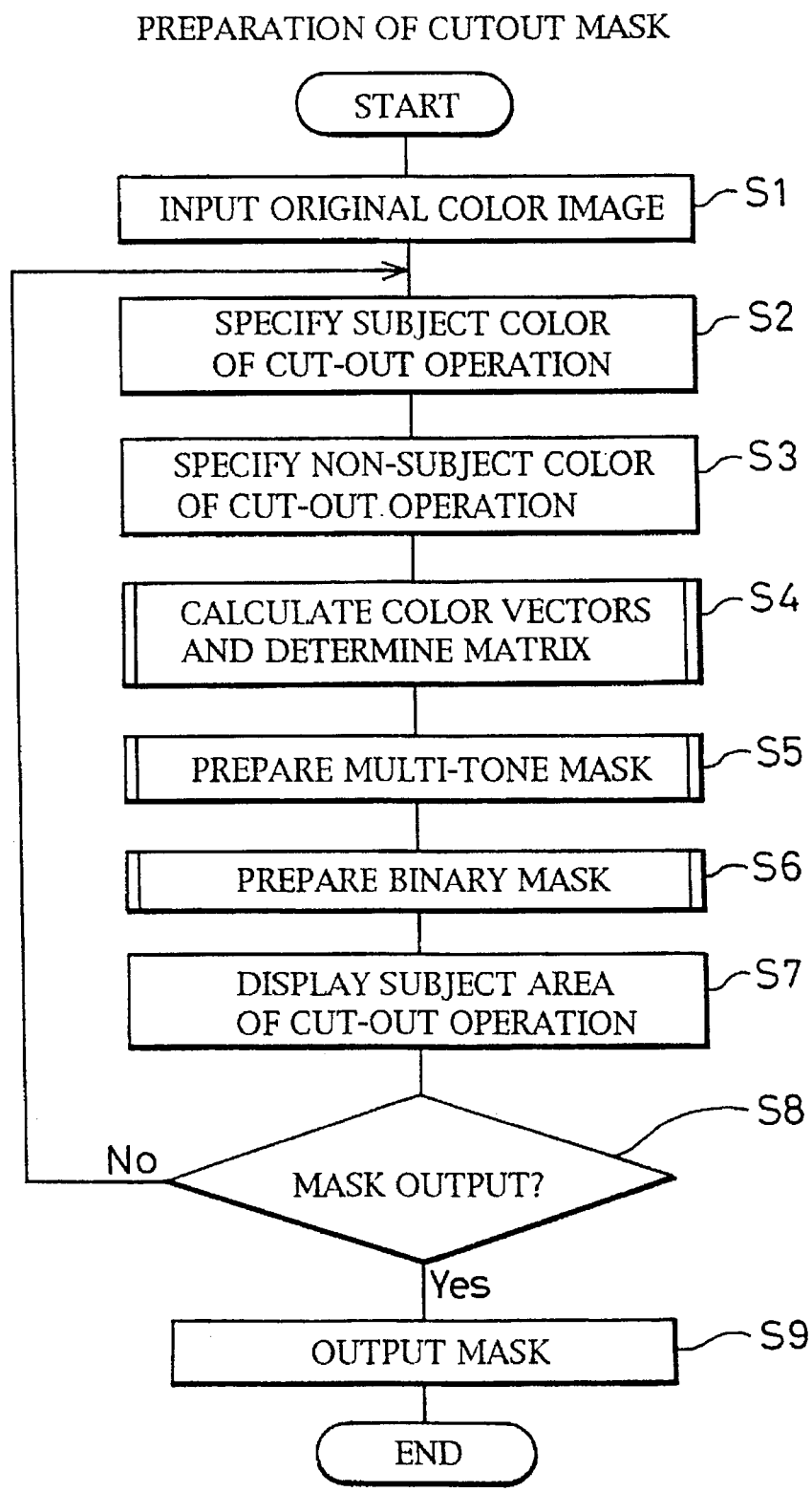
FIG. 3 is a flowchart showing a procedure of preparing a cutout mask in the first embodiment.

FIG. 3 is a flowchart showing a procedure of preparing a cutout mask in the first embodiment. At step S1, image data representing an original color image are captured by the scanner 36 and stored in the original image memory 22. The original color image is, for example, a color photograph as shown in FIG. 1(A). The original image memory 22 includes a frame memory, and the image stored in the original image memory 22 is displayed on the color CRT 38.

At steps S2 and S3, the user specifies a subject color and a non-subject color of the cutout process on the color image displayed on the color CRT 38. The subject color is a color whose area is to be extracted as a mask, and the non-subject color is a color whose area is excluded from the mask. By way of example, the user specifies 'yellow', that is, the background color of the clothes in FIG. 1(A), as a subject color and the 'flesh tint' of the model as a non-subject color. The user can specify the subject color and the non-subject color by pointing respective dots in the color image displayed on the color CRT 38 with a pointing device such as the mouse 34. Alternatively, the subject color can be specified by selecting plural dots of similar colors and obtaining their average color. This is also the case with the non-subject color.

The processing of steps S2 through S8 in the flowchart of FIG. 3 is repeated. The subject color and the non-subject color specified in the first cycle of the steps S2–S8 are specifically referred to as 'first-cycle subject color' and 'first-cycle non-subject color'.

Figure 4:
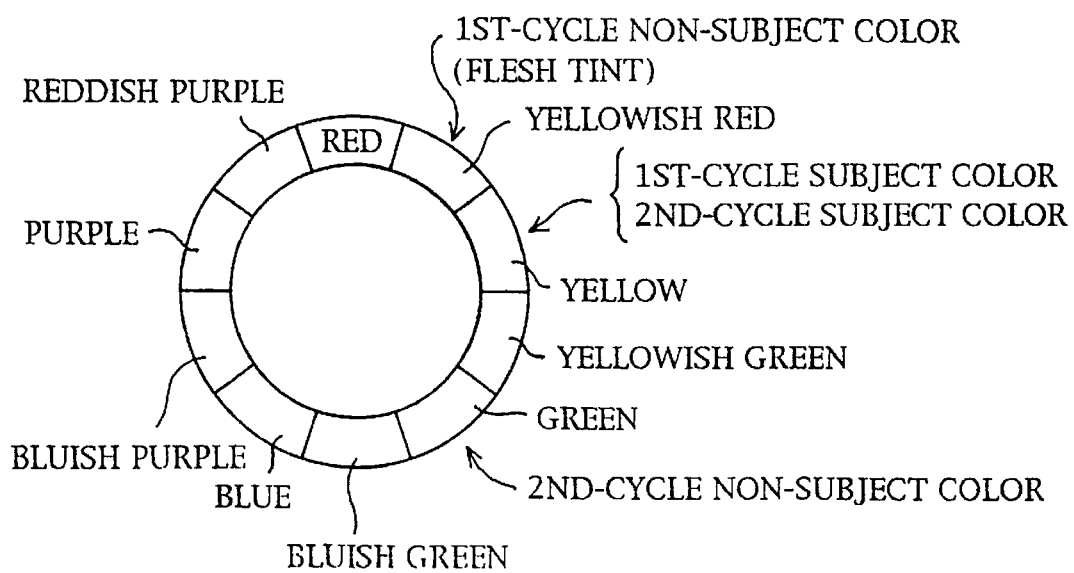
FIG. 4 shows subject colors and non-subject colors on the Munsell's hue ring.

FIG. 4 shows the positions of the subject color and the non-subject color on the Munsell's hue ring. The first-cycle subject color 'yellow' and the first-cycle non-subject color 'flesh tint' are placed in proximity to each other on the Munsell's hue ring. As in this example, the present invention can specify the subject color and the non-subject color which have similar hues to each other.

At step S4, the matrix operation unit 50 (FIG. 2) calculates color vectors representing the subject color and the non-subject color to obtain a matrix including the color vectors.

Figure 5:
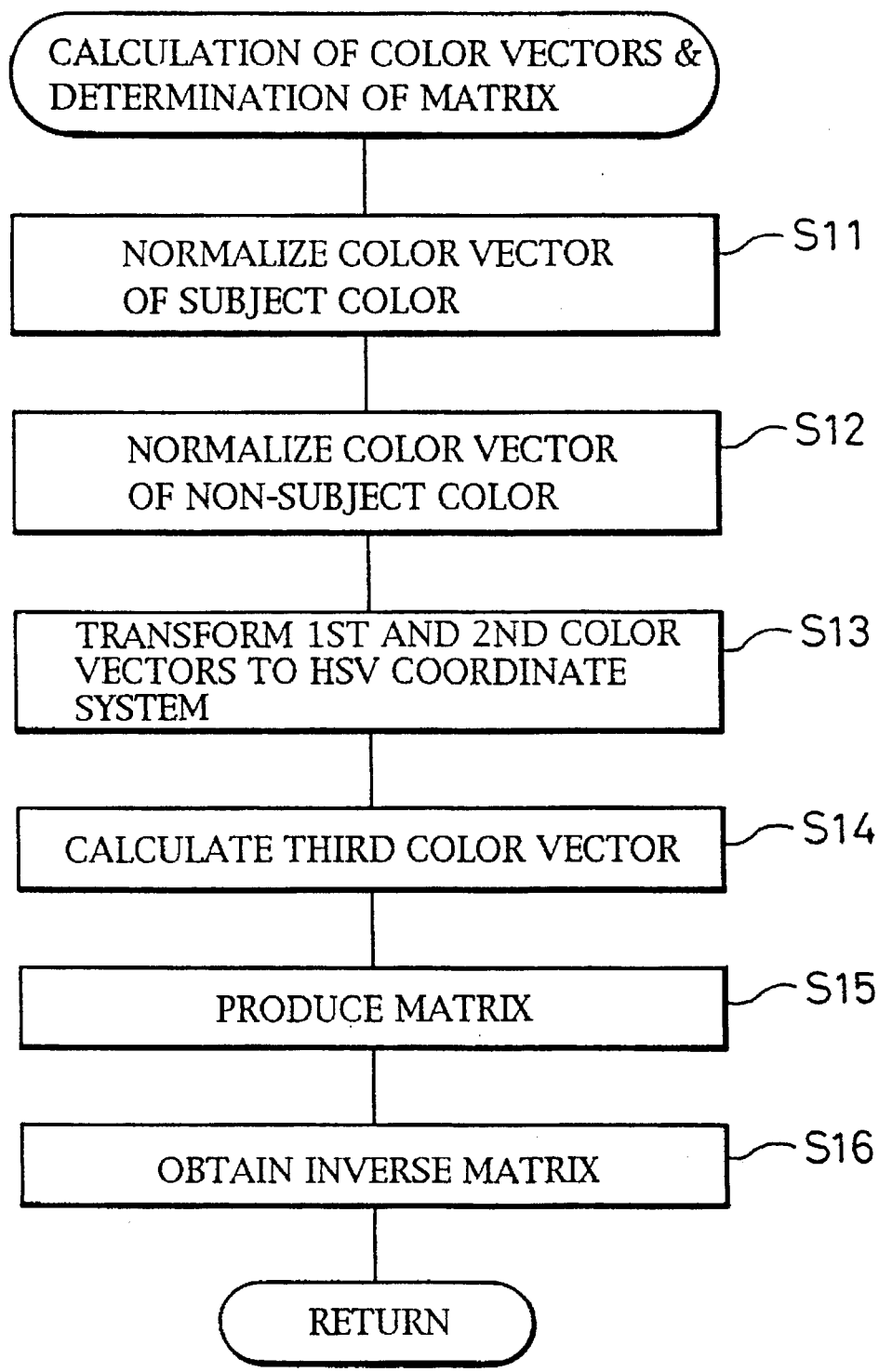
FIG. 5 is a flowchart showing details of the processing executed at step S4 in the flowchart of FIG. 3.
Figure 6:
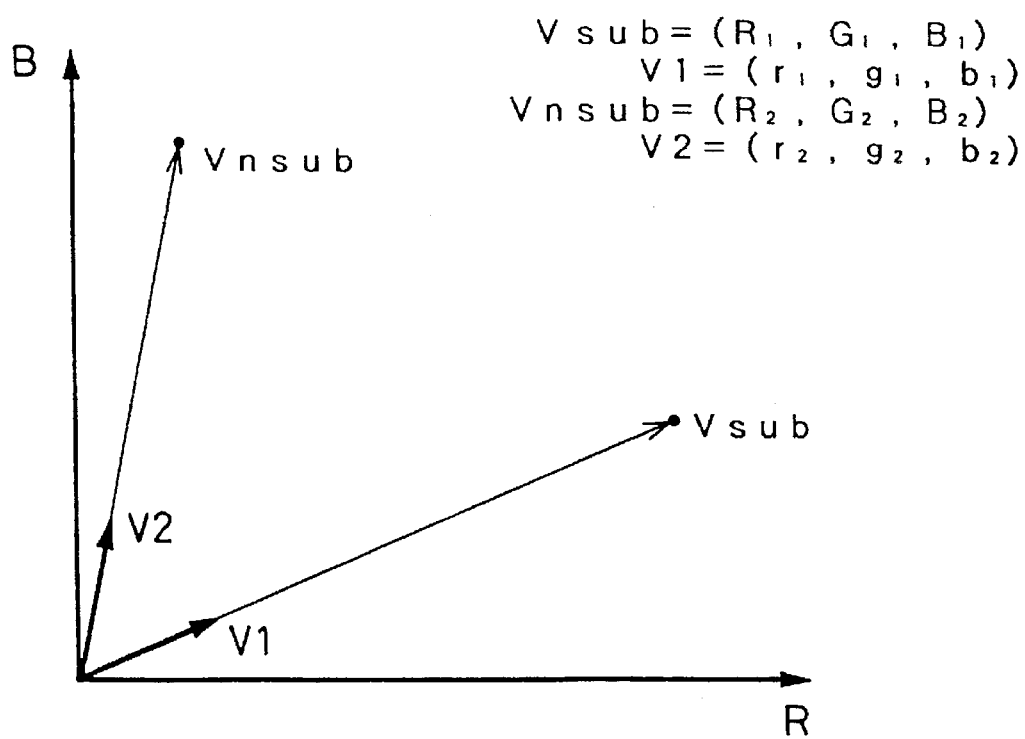
FIG. 6 is a graph showing a first color vector V1 and a second color vector V2.

FIG. 5 is a flowchart showing details of step S4. At step S11, the matrix operation unit 50 normalizes a color vector representing the subject color to determine a first color vector. FIG. 6 is a graph showing a first color vector for the subject color and a second color vector for the non-subject color. A color vector representing a subject color Csub is given by Vsub(R1,G1,B1), where (R1,G1,B1) respectively denote R (Red), G (Green), and B (Blue) components of the subject color Csub. For convenience of illustration, the G axis of the RGB space is omitted in the graph of FIG. 6. At step S11, the matrix operation unit 50 determines a unit vector V1(r1,g1,b1) of the color vector Vsub and stores the components (r1,g1,b1) of the unit vector in the vector memory 24. The unit vector denotes a vector whose length is equal to one. The process then goes to step S12 at which the matrix operation unit 50 determines a unit vector V2(r2, g2,b2) of a color vector Vnsub(R2,G2,B2) representing the non-subject color and stores the components (r2,g2,b2) of the unit vector in the vector memory 24 in the same manner as above.

The first color vector V1 and the second color vector V2 thus obtained represent two of three vectors constituting a basis for expressing colors in the RGB space. A unit vector independent of the first and second color vector V1 and V2 is selected as a third color vector V3 for constructing the basis. This means that the third color vector V3 is a unit vector which is not a linear combination of the first and second color vectors V1 and V2. For example, a unit vector VWH representing 'white' can be selected as the third color vector V3. The unit vector VWH representing white has components of $$\left(\frac{1}{\sqrt{3}}, \frac{1}{\sqrt{3}}, \frac{1}{\sqrt{3}}\right).$$

Figure 7:
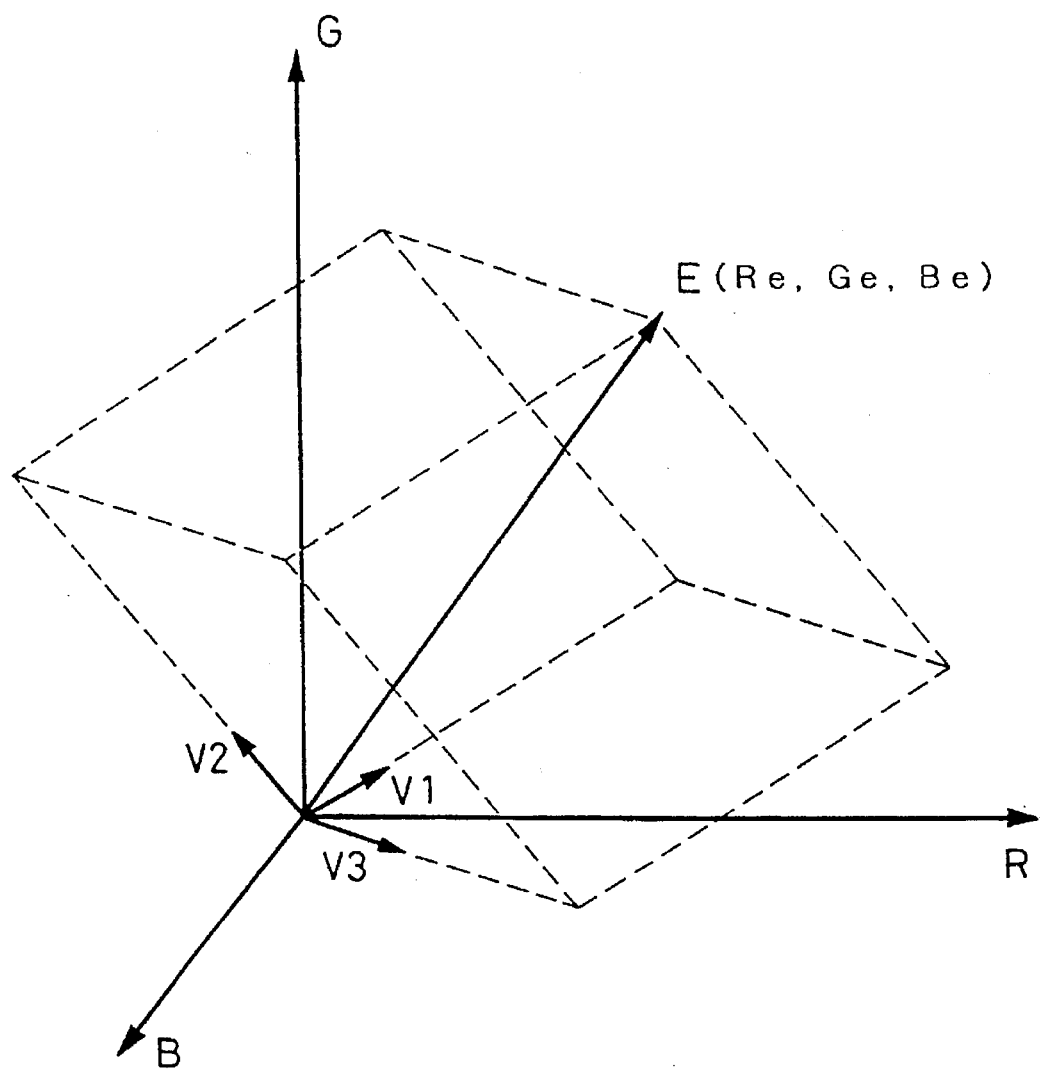
FIG. 7 shows the first through the third color vectors V1, V2, and V3 in an RGB space.

FIG. 7 shows the first through third color vectors V1, V2, and V3 in the RGB space. In this embodiment, linearly independent three color vectors V1, V2, and V3 define a basis of the color space, and any color E(Re,Ge,Be) in the color space is expressed as a linear combination of the three color vectors V1, V2, and V3 as given by Equations (1a)–(1c):

$$E = \begin{pmatrix} Re \\ Ge \\ Be \end{pmatrix} = k1V1 + k2V2 + k3V3 = \qquad (1a)$$

$$k1 \begin{pmatrix} r1 \\ g1 \\ b1 \end{pmatrix} + k2 \begin{pmatrix} r2 \\ g2 \\ b2 \end{pmatrix} + k3 \begin{pmatrix} r3 \\ g3 \\ b3 \end{pmatrix} = KM$$

$$K = (k1, k2, k3) \qquad (1b)$$

$$M = \begin{pmatrix} V1 \\ V2 \\ V3 \end{pmatrix} = \begin{pmatrix} r1 & g1 & b1 \\ r2 & g2 & b2 \\ r3 & g3 & b3 \end{pmatrix} \qquad (1c)$$

As described later in detail, mask data representing a mask are prepared based on the coefficient k1 for the first color vector V1 regarding the subject color. If either one of the first and second color vector V1 and V2 coincides with the third color vector V3 representing "white", the three color vectors are not linearly independent, and an arbitrary color can not be expressed by the three color vectors V1 through V3 accordingly. Also, if either the first color vector V1 or the second color vector V2 is sufficiently close to the third color vector V3 representing "white", the coefficient k1 for the first color vector V1 may become excessively large or small. At step S13 in the flowchart of FIG. 5, it is determined whether either one of the first color vector V1 and the second color vector V2 is sufficiently close to the unit white vector $$V_{WH}\left(\frac{1}{\sqrt{3}}, \frac{1}{\sqrt{3}}, \frac{1}{\sqrt{3}}\right).$$

When one of the color vectors V1 and V2 is sufficiently close to the unit white vector $V_{WH}$, the program proceeds to step S14 at which another vector other than the unit vector $V_{WH}$ is determined as the third color vector V3.

In concrete procedures of step S13, the first color vector V1 and the second color vector V2 are transformed to vectors in an HSV coordinate system or Hue/Saturation/Brightness system according to Equations (2a)–(2e) given as:

$$\text{MAX} = \max(r, g, b) \qquad (2a)$$

$$\text{MIN} = \min(r, g, b) \qquad (2b)$$

$$H = \arctan\left\{\frac{\sqrt{3}\,(g-b)}{(r-g)+(r-b)}\right\} \qquad (2c)$$

$$V = \frac{\text{MAX} - \text{MIN}}{2} \qquad (2d)$$

$$S = \text{MAX} - \text{MIN} \qquad (2e)$$

In Equations (2a)–(2e), operators 'max( )' and 'min( )' respectively represent operations of selecting a maximum and a minimum among values in parentheses. Equations (2a)–(2e) give a hue H, a saturation S, and a brightness V for each of the first color vector V1(r1,g1,b1) and the second color vector V2(r2,g2,b2).

Figure 8:
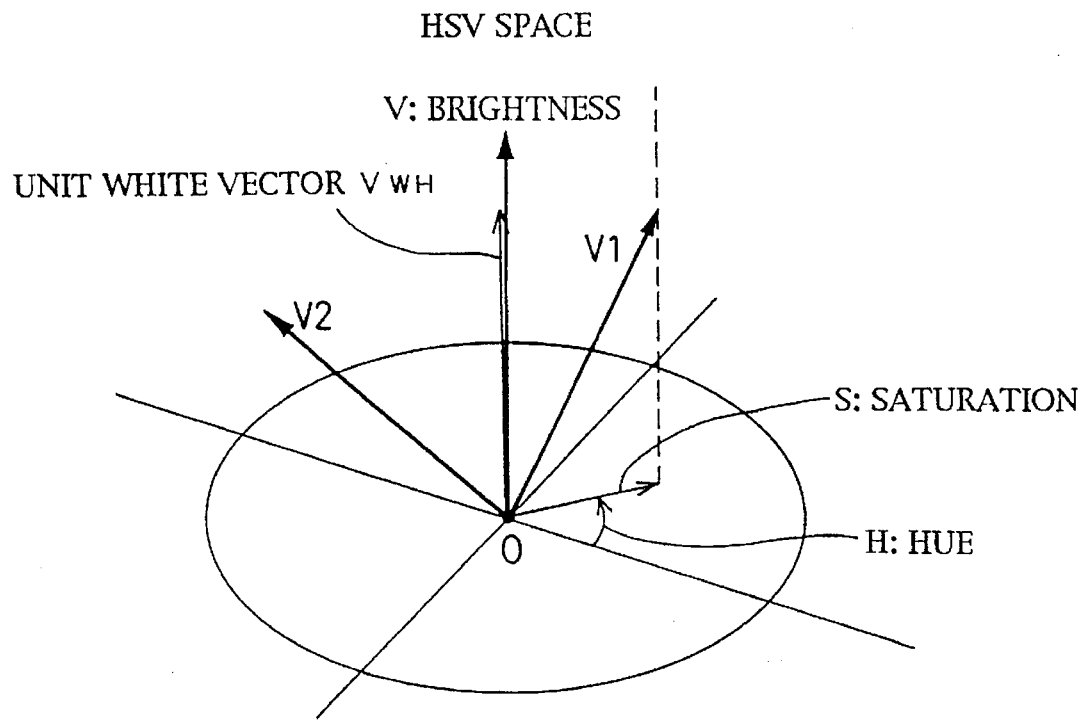
FIG. 8 shows an HSV space.

FIG. 8 shows the HSV space, where the unit vector $V_{WH}$ representing white exists on the coordinate axis of brightness V. This means that the unit white vector $V_{WH}$ does not have either the saturation S or the hue H. The HSV space is a cylindrical polar coordinate system or zrθ coordinate system, where the brightness V corresponds to a vertical coordinate z, the saturation S to a distance r from the z-axis, and the hue H to an angle θ.

A color vector of small saturation S is close to the unit white vector $$V_{WH}\left(\frac{1}{\sqrt{3}}, \frac{1}{\sqrt{3}}, \frac{1}{\sqrt{3}}\right).$$

When at least one of the first vector V1 and the second vector V2 has the saturation S not greater than a predetermined level, it is determined that the color vector is sufficiently close to the unit white vector $V_{WH}$. When each component is given as 8-bit data or expressed as a number in the range of 0 through 255, the predetermined level can be set equal to 10, or 0Ah in hexadecimal notation.

Alternatively, it can be determined that a color vector is sufficiently close to the unit white vector $V_{WH}$ when the ratio S/V of the saturation to the brightness is not greater than a predetermined value.

Figure 9:
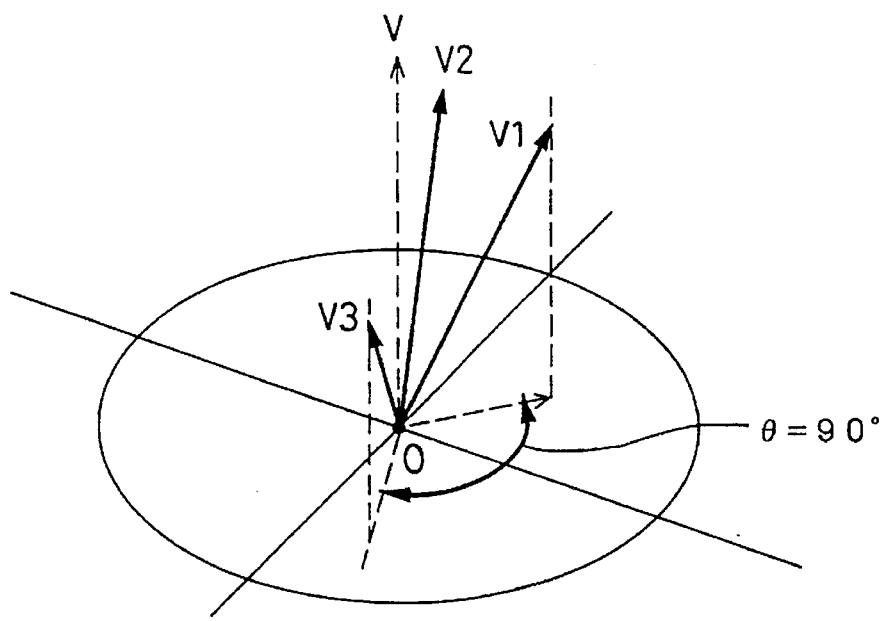
FIG. 9 shows a process of determining a vector other than a unit vector $V_{WH}$ of the white color as a third color vector V3.

When at least one of the first color vector V1 and the second color vector V2 is sufficiently close to the unit white vector $V_{WH}$, another vector other than the unit white vector $V_{WH}$ is set as the third color vector V3 at step S14 of FIG. 5. FIG. 9 shows a process of specifying another vector other than the unit white vector $V_{WH}$ as the third color vector V3. One of the first and second color vectors V1 and V2 which is farther from the unit white vector $V_{WH}$ is selected first. In the example of FIG. 9, the first color vector V1 with the relatively large saturation S is selected. A value of 90 is then subtracted from the hue H of the selected first color vector V1. This is equivalent to a clockwise rotation of the first color vector V1 by 90 degrees in the HSV space. A vector (H-90,S,V) thus obtained is inversely transformed to a vector in the RGB coordinate system, and the R, G, and B components of the transformed vector are normalized to give a unit vector as the new third color vector V3. The third color vector V3 determined through such operations is also shown in FIG. 9. The angle of rotation in the above operation can be set equal to an arbitrary value other than 90 degrees.

The third color vector V3 thus obtained is linearly independent of the first color vector V1 and the second color vector V2, and therefore the three color vectors V1 through V3 will constitute a basis of the color space. In other words, any color in the color space is expressed as a linear combination of the three color vectors V1 through V3 as given by the above Equations (1a)–(1c). Since the third color vector V3 is obtained by rotating the hue component of the first color vector V1 or the second color vector V2, the third color vector V3 represents a real color. Since the three color vectors V1 through V3 respectively represent real colors, and the coefficients k1 through k3 for these color vectors actually give a mixing ratio of the three real colors.

The third color vector V3 can be set to be linearly independent of the first color vector V1 and the second color vector V2 by a variety of methods other than the above process. For example, a cross product V1×V2 of the first and the second color vectors V1 and V2 can be set as the third color vector V3. In this case, however, the cross product V1×V2 may not represent a real color and the coefficients k1 through k3 for the respective color vectors do not accordingly have actual significance. It is thus preferable to determine the third color vector by rotating the hue component of the first color vector or the second color vector as described above.

After the third color vector V3 is determined as above, the matrix operation unit 50 prepares a 3×3 matrix M given by Equations (1c) consisting of the components of the three color vectors V1 through V3 at step S15 of FIG. 5. The 3×3 matrix M is stored in the matrix memory 26.

A set of coefficients K(k1,k2,k3) for the arbitrary color E(Re,Ge,Be) is given by the following Equation (3):

$$K = EM^{-1} \qquad (3)$$

The set of coefficients K(k1,k2,k3) can be determined by multiplying a matrix of the arbitrary color E(Re,Ge,Be) by an inverse of the matrix M. Therefore, at step S16, the matrix operation unit 50 calculates the inverse matrix $M^{-1}$ and stores the inverse matrix $M^{-1}$ in the matrix memory 26.

Figure 10:
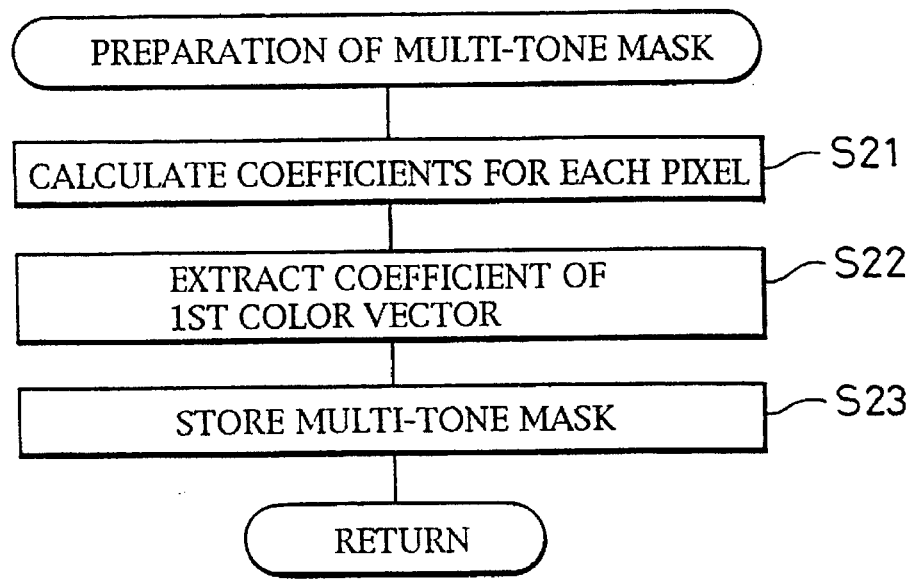
FIG. 10 is a flowchart showing a procedure of preparing a multi-tone mask.

After the process of step S4 shown in FIG. 5 is completed, a multi-tone mask is prepared at step S5 shown in FIG. 3. FIG. 10 is a flowchart showing a procedure of preparing a multi-tone mask. At step S21, the multi-tone mask operation unit 52 reads out color data E(Re,Ge,Be) of each pixel in the color image from the original image memory 22, and substitutes the data E(Re,Ge,Be) into the right side of the above Equation (3) to determine the set of coefficients K(k1,k2,k3). The first coefficient k1 for the first color vector V1 is extracted from the set of coefficients K(k1,k2,k3) at step S22 and stored in the multi-tone mask memory 28 at step S23.

The first coefficient k1 for each pixel represents the contribution of the first color vector V1 to the color of each pixel. The greater the contribution of the first color vector V1 to the color of each pixel, the larger the first coefficient k1. Bitmap data representing the first coefficients k1 for all the pixels in the color image will represent a multi-tone mask defining the area whose color is proximate to the subject color.

When the value of the first coefficient k1 is negative for a certain pixel, the pixel has a color just opposite to the subject color of the cut-out operation. In such cases, the value of the first coefficient k1 can be replaced by zero.

Alternatively, a value kk=k1/k1a, where k1 is the first coefficient for each pixel and k1a is the first coefficient k1a for the subject color (k1a=R1/r1=G1/g1=B1/b1), can be used as multi-tone mask data. In this case, a value kk more than one can be forced to be one, and a negative value kk can be forced to be zero. This allows bit map data representing the multi-tone mask to be in the range of 0 through 1, thereby simplifying the steps of setting a threshold value in binarization process described later.

According to another structure, the three coefficients k1, k2, and k3 for each pixel are normalized according to Equations (4a) through (4c) given below, and bit map data of a normalized coefficient ku1 is used to represent a multi-tone mask.

$$ku1 = \frac{k1}{\sqrt{k1^2 + k2^2 + k3^2}} \quad (4a)$$

$$ku2 = \frac{k2}{\sqrt{k1^2 + k2^2 + k3^2}} \quad (4b)$$

$$ku3 = \frac{k3}{\sqrt{k1^2 + k2^2 + k3^2}} \quad (4c)$$

The coefficient ku1 is preferably set equal to zero for the negative values. This also allows bit map data of the coefficient ku1 to be in the range of 0 through 1, thereby simplifying the steps of setting a threshold value in binarization process described later.

The multi-tone mask is, for example, applied to openwork composition, where the intensity of the subject color is utilized as a composition ratio. In another application, the strength and weight of image processing can be controlled according to the multi-tone mask. In the process of contour enhancement in an image, for example, the contour is strongly enhanced in portions with the high mask value and slightly enhanced in other portions with the low mask value.

After preparation of the multi-tone mask, the binary operation unit 54 binarizes the multi-tone mask to produce a binary mask at step S6 of FIG. 3. A threshold value applied to the binarization process can be determined by the following various methods.

Figure 11:
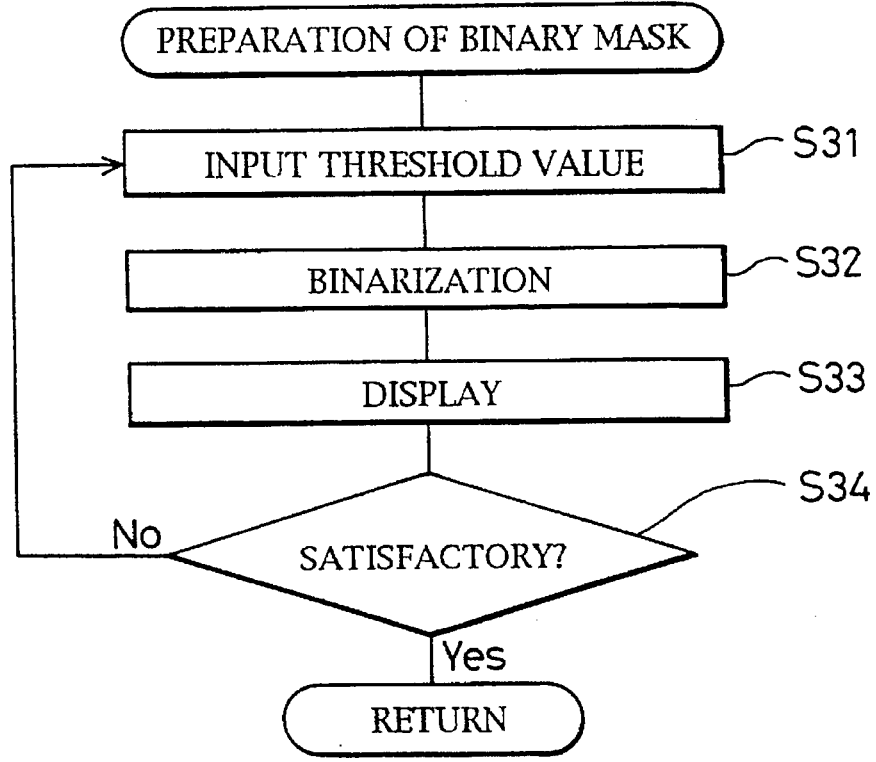
FIG. 11 is a flowchart showing a procedure of preparing a binary mask.

FIG. 11 is a flowchart showing a procedure of preparing a binary mask, where a threshold value is input manually. When the user inputs a threshold value through interactive operations at step S31, the binary operation unit 54 binarizes the multi-tone mask with the input threshold value to produce a binary masks at step S32. The user checks the binary mask displayed on the color CRT 38 and determines whether the binary mask is satisfactory at steps S33 and S34. It is preferable to display both of the color image and the binary mask side by side as shown in FIGS. 1(A) and 1(B). When the binary mask thus prepared is unsatisfactory at step S34, the program returns to step S31 to wait for input of a new threshold value to execute the binarization process again. When the binary mask is satisfactory at step S34, on the contrary, the program exits from the binarization process. The procedure of FIG. 11 allows the user to prepare a desirable binary mask.

Figure 12:
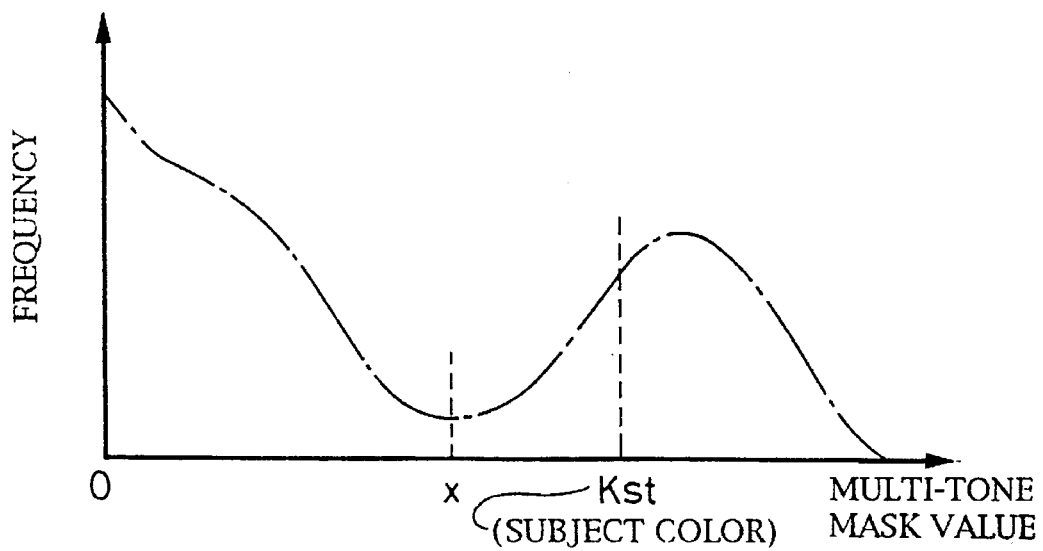
FIG. 12 is a histogram of multi-tone mask data.

In an alternative method, the threshold value applied to the binarization process is automatically set based on a distribution of the multi-tone mask. FIG. 12 is a histogram of multi-tone mask data. A value Kst on the abscissa of FIG. 12 represents a multi-tone mask value for a subject color. A color image generally includes considerably many pixels having colors close to the subject color of cut-out operation, and a peak of the histogram accordingly appears in the vicinity of the mask value of the subject color. Since the background of the image has dark colors, another peak appears in the region of small mask values. Under such conditions, the frequency of appearance reaches a local minimum at a value x smaller than the mask value Kst of the subject color as shown in FIG. 12. The mask value x, which is smaller than the mask value Kst of the subject color and gives a local minimum for the frequency of appearance, is set as the threshold value to be applied to the binarization process. The threshold value thus determined gives a binary mask representing a color area whose color is proximate to the subject color.

Figure 13:
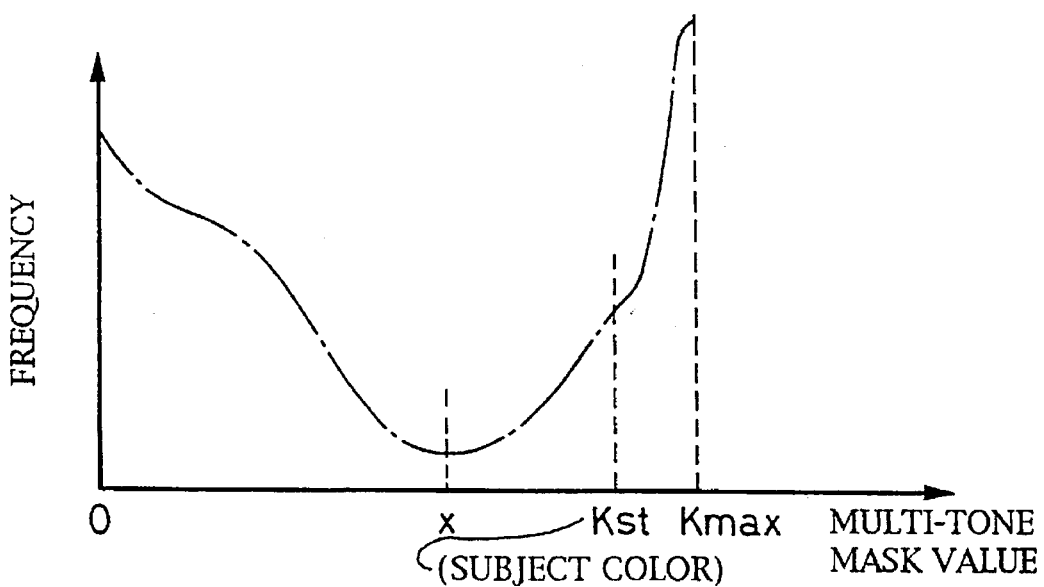
FIG. 13 is another histogram of multi-tone mask data.

The mask value x giving the local minimum for the frequency of appearance can be determined more easily by setting a maximum of the multi-tone mask value equal to a predetermined value Kmax and substituting all the values not less than Kmax by the predetermined value Kmax as shown in FIG. 13. The value Kmax is, for example, 128 when the multi-tone mask value is expressed by 8-bit data.

A non-hierarchical clustering method (also called reallocation method or k-mean method) can also be applied to determine the threshold value of the binarization process based on the histogram of the multi-tone mask data. This method determines clusters in the histogram and specifies a lower limit of a cluster for the subject color as a threshold value, thus preparing a binary mask representing a color area close to the subject color.

Figure 14:
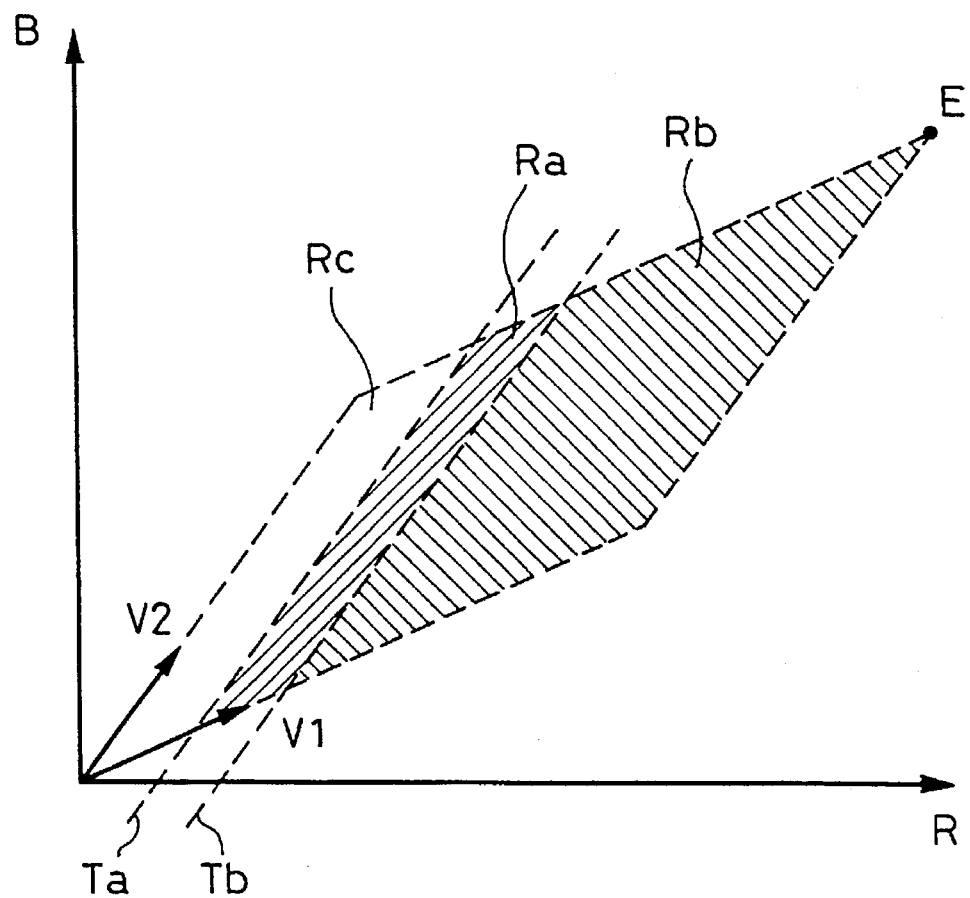
FIG. 14 is a graph showing color areas cut out by a binary mask.

FIG. 14 is a graph showing color areas cut out by the binary mask. A region (Ra+Rb) has colors whose coefficient k1 for the first color vector V1 is no less than a value Ta, whereas another region Rb has colors whose coefficient k1 is no less than another value Tb. A binary mask representing a color area in the region (Ra+Rb) is prepared by setting the threshold value of the binarization process equal to the value Ta. In this case, colors in a region Rc adjacent to the region Ra have smaller fractions of the subject color and are thus excluded from the binary mask. In a similar manner, a binary mask representing a color area in the region Rb is prepared by setting the threshold value of the binarization process equal to the value Tb.

Figure 15:
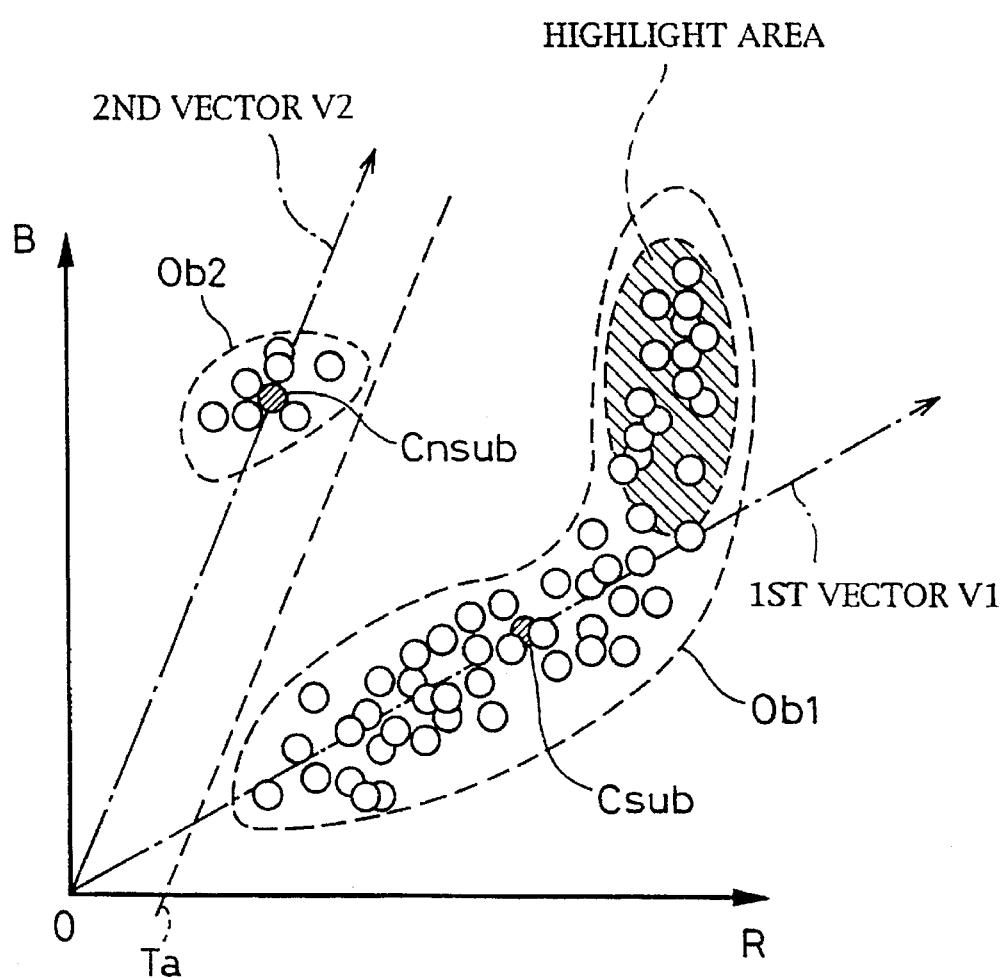
FIG. 15 shows effects of a first mask prepared in the first embodiment.

FIG. 15 shows effects of a first mask prepared by one cycle of steps S2 through S7 in the flowchart of FIG. 3. A number of circles in FIG. 15 represent a distribution of colors in the color image. The color image includes a first set Ob1 of pixels having colors close to the subject color Csub and a second set Ob2 of pixels having colors close to the non-subject color Cnsub. The first set Ob1 includes colors in an area glistening with reflected rays at the time of photographing (generally referred to as highlight area). In the original color image of FIG. 1(A), for example, the glistening area of the yellow clothes corresponds to a highlight area. According to the procedures described above, a binary mask including the first set Ob1 with the highlight area and excluding the second set Ob2 is prepared by setting the threshold value equal to a value Ta shown in FIG. 15. Since both the highlight area in the first set Ob1 and the second set Ob2 have large fractions of the blue component, the conventional method can not adequately separate the highlight area from the second set Ob2. The method of the embodiment, on the contrary, can easily distinguish the highlight area having a color proximate to the subject color from the area of the second set Ob2.

When the color of the clothes or yellow is specified as the first-cycle subject color Csub and 'flesh tint' of the model as the first-cycle non-subject color Cnsub in the original color image of FIG. 1(A), a mask representing the yellow area of the clothes can be obtained as shown in FIG. 1(B). As clearly seen from the Munsell's hue ring of FIG. 4, 'green' has a hue opposite to that of the first-cycle non-subject color of flesh tint with respect to the first-cycle subject color of yellow. Specification of yellow as the first-cycle subject color Csub and flesh tint as the first-cycle non-subject color Cnsub allows the green areas of the leaves to be included in the mask area accordingly. This means that a binary mask including yellow areas and green areas is prepared as shown in FIG. 1(B).

The first cycle of steps S2 through S8 in the flowchart of FIG. 3 gives a mask including an area whose color is close to the first-cycle subject color Csub and excluding an area whose color is close to the first-cycle non-subject color Cnsub by simply specifying the first-cycle subject color Csub and the first-cycle non-subject color Cnsub.

When preparation of the first mask is completed, the binary mask data are combined with image data of the original color image, and a subject area of cut-out operation is displayed on the color CRT 38 at step S7 of FIG. 3. FIG. 16(A) shows a displayed image where a subject area and a non-subject area of cut-out operation are distinguished from each other. In the drawing of FIG. 16(A), the non-subject area hatched with broken lines is displayed in multi-tone gray while the first mask area, or a subject area of cut-out operation, is displayed in colors. The first mask area includes yellow and green areas as shown in FIG. 1(B). Any method other than that described above can be applied to distinguish a subject area of cut-out operation or mask area from a non-subject area. For example, the non-subject area can be displayed in black and white.

The user checks the subject area of cut-out operation displayed on the color CRT 38 and determines whether the mask obtained is satisfactory or not at step S8 of FIG. 3. When the mask is unsatisfactory, the program returns to step S2 to repeat the procedure of steps S2 through S8. In the second cycle of the procedure, a second-cycle subject color and a second-cycle non-subject color are specified at step S3 within the color part of the subject area of cut-out operation, and steps S5 through S7 are also executed on the color part of the subject area of cut-out operation. In the example shown in FIG. 4, the same color as the first-cycle subject color, that is, yellow is specified as the second-cycle subject color, while green is specified as the second-cycle non-subject color. The first mask includes yellow and green areas as shown in FIG. 16(A). Selection of green as the second-cycle non-subject color within the first mask area will produce a second mask which only includes a yellow area as illustrated in FIG. 16(B). When the second mask thus obtained is still unsatisfactory, steps S2 through S8 are repeated again. The procedure of steps S2 through S8 is repeated until a desirable mask representing an area whose color is close to the subject color is obtained.

When a desirable mask is obtained, at least either one of the binary mask and the multi-tone mask is output at step S9.

B. Modification of First Embodiment (1) Although the RGB coordinate system is applied as the color space in the first embodiment described above, various color coordinate systems, such as a CIE-XYZ coordinate system, a YMC coordinate system, or a YUV coordinate system can be applied instead.

(2) The first coefficient k1 calculated according to Equation (3) or ku1 according to Equations (4a) can be used as multi-tone mask data. In this case, the value of the binary mask is set equal to one for pixels having positive multi-tone mask data and equal to zero for pixels having negative multi-tone mask data. This means that the threshold value is set equal to zero. This alternative method gives a preferable binary mask suited for color correction of the original color image.

(3) The first through third color vectors are not necessarily unit vectors. Each of the first through third color unit vectors, however, represents only a hue. This allows a mask area to be determined according to the hue of each pixel in the original color image in preparation of a mask based on the first coefficient as described previously.

(4) Although the same color as the first-cycle subject color is independently specified as the second-cycle subject color in the above embodiment, it is not required to specify a subject color in the second cycle again, but the subject color can be assumed to be the same in all the cycles. In other cases, different colors can be specified as a subject color in respective cycles of the procedure of steps S2 through S8.

C. Second Embodiment

In each cycle of the procedure from steps S2 through S8 of FIG. 3, n pieces of subject colors and m pieces of non-subject colors can be specified, where n and m are integers. In this case, a mask is prepared according to the same procedures as the first embodiment shown in FIG. 3 with modifications described below.

Figure 17:
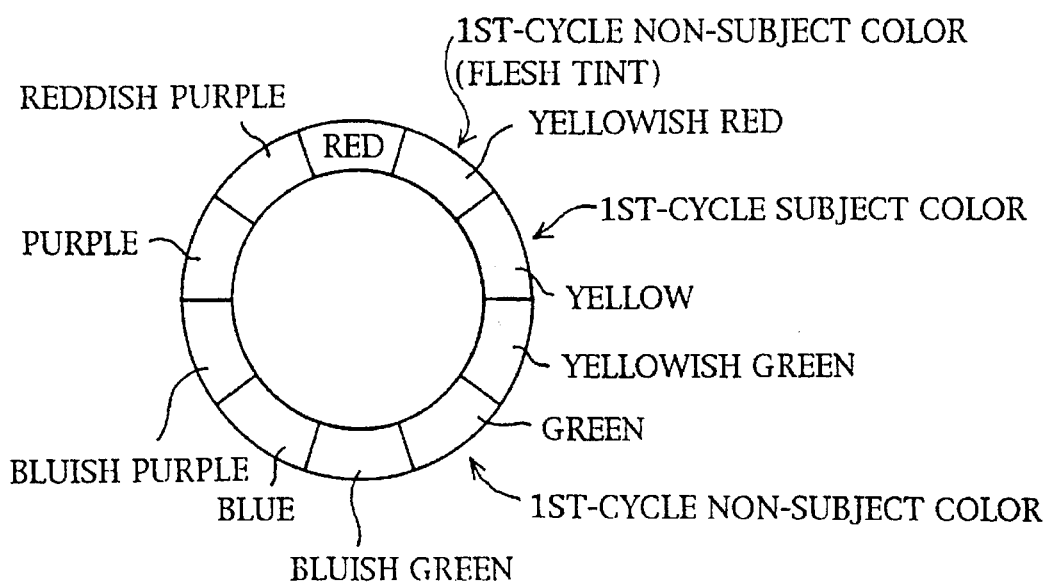
FIG. 17 shows a subject color and non-subject colors on the Munsell's hue ring in a second embodiment.

At steps S2 and S3 in the flowchart of FIG. 3, the user respectively specifies n pieces of subject colors and m pieces of non-subject colors of cut-out operation on the color image displayed on the color CRT 38, where at least one of n and m is equal to or greater than two. By way of example, the background color of the clothes, or yellow, in the drawing of FIG. 1(A) is specified as a subject color while the color of rose leaves, or green, and flesh tint of the model are specified as non-subject colors. This corresponds to n=1 and m=2. Specification of colors is executed by pointing dots in the color image displayed on the color CRT 38 with a pointing device, such as the mouse 34. FIG. 17 shows the subject color and the non-subject colors specified in the second embodiment.

At step S4 of FIG. 3, the matrix operation unit 50 (FIG. 2) calculates color vectors representing the subject colors and the non-subject colors and determines matrices as described later.

Details of the step S4 in the second embodiment are equivalent to those of the first embodiment shown in FIG. 5. At step S11 of FIG. 5, n pieces of first color vectors are calculated by normalizing n pieces of color vectors representing the n pieces of subject colors. FIGS. 18(A) and 18(B) illustrate a first color vector and second color vectors, respectively. A color vector representing the subject color Csub1 is expressed as $V_{sub1}(R_{A1}, G_{A1}, B_{A1})$, where ($R_{A1}$, $G_{A1}, B_{A1}$) respectively denote R, G, and B components of the subject color Csub1. For convenience of illustration, the G axis of the RGB space is omitted in the graphs of FIGS. 18(A) and 18(B). At step S11, the matrix operation unit 50 determines a unit vector $V_{A1}(r_{A1}, g_{A1}, b_{A1})$ of the color vector $V_{sub1}$ and stores the components ($r_{A1}, g_{A1}, b_{A1}$) of the unit vector in the vector memory 24. A unit vector denotes a vector whose length is equal to one.

The program then goes to step S12 at which the matrix operation unit 50 determines unit vectors $V_{B1}(r_{B1}, g_{B1}, b_{B1})$ and $V_{B2}(r_{B2}, g_{B2}, b_{B2})$ of color vectors $V_{nsub1}(R_{B1}, G_{B1}, B_{B1})$ and $V_{nsub2}(R_{B2}, G_{B2}, B_{B2})$ representing the two non-subject colors, and stores the components ($r_{B1}, g_{B1}, b_{B1}$) and ($r_{B2}, g_{B2}, b_{B2}$) of the unit vectors in the vector memory 24.

Combinations of the n pieces of first color vectors $V_{Ai}$ (i=1 through n) and the m pieces of second color vectors $V_{Bj}$ (j=1 through m) will make 'n×m' sets of bases for expressing colors in the color space. A unit vector independent of the first color vector $V_{Ai}$ and the second color vector $V_{Bj}$ is selected as a third color vector $V_{Cij}$ to construct each basis. This means that the third color vector is a unit vector which is not defined as a linear combination of the first and second color vectors $V_{Ai}$ and $V_{Bj}$. The unit white vector $V_{WH}$ can be selected as the third color vector $V_{Cij}$. The unit white vector $V_{WH}$ has components $$\left(\frac{1}{\sqrt{3}}, \frac{1}{\sqrt{3}}, \frac{1}{\sqrt{3}}\right).$$

Figure 19:
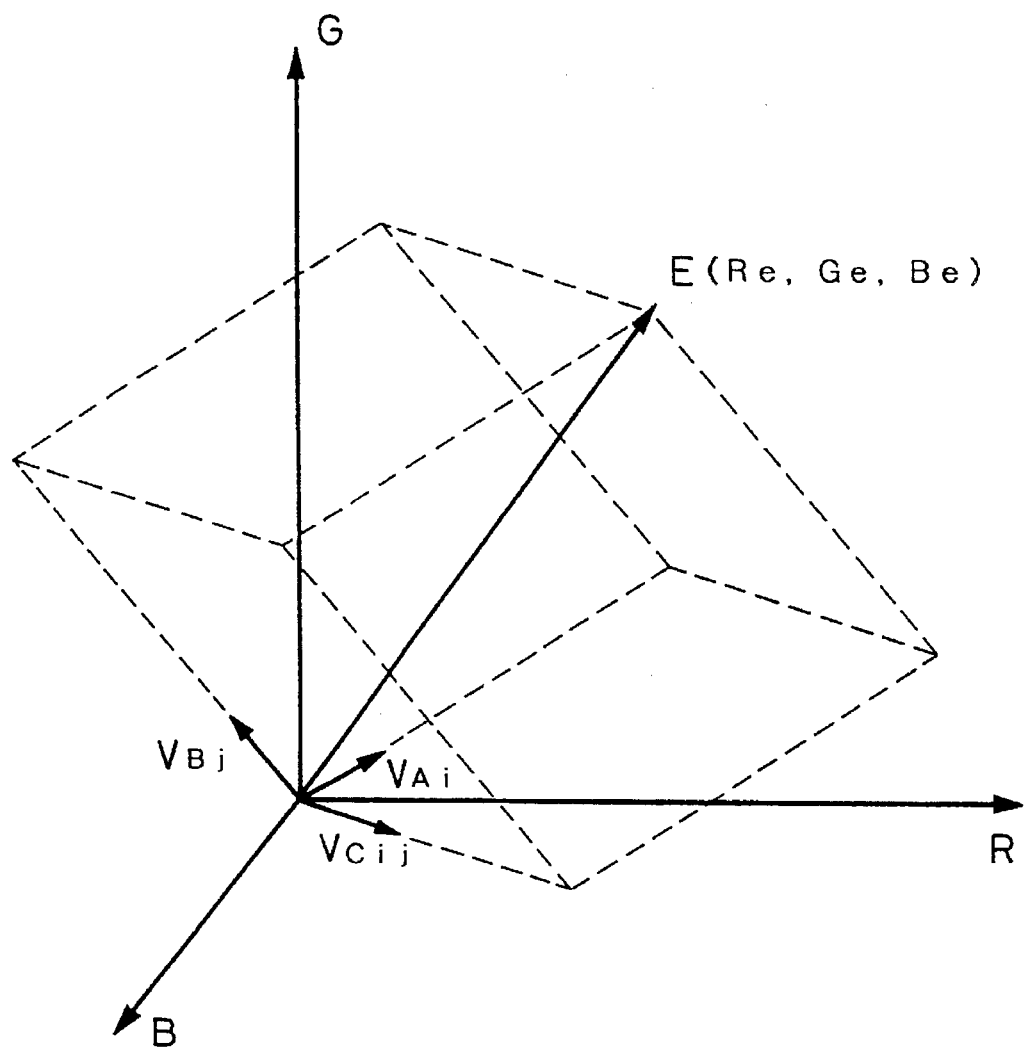
FIG. 19 shows first through third color vectors $V_{Ai}$, $V_{Bj}$, and $V_{Cij}$ in the RGB space.

FIG. 19 shows the first through third color vectors $V_{Ai}$, $V_{Bj}$, and $V_{Cij}$ in the color space. In this second embodiment, linearly independent three color vectors $V_{Ai}$, $V_{Bj}$, and $V_{Cij}$ define each set of 'n×m' bases, and any color E(Re,Ge,Be) in the color space is expressed as a linear combination of the three color vectors $V_{Ai}$, $V_{Bj}$, and $V_{Cij}$ of each set as given by Equations (5a)–(5c):

$$E = \begin{pmatrix} Re \\ Ge \\ Be \end{pmatrix} \quad (5a)$$

$$= k1(i,j) V_{Ai} + k2(i,j) V_{Bj} + k3(i,j) V_{Cij}$$

$$= k1(i,j) \begin{pmatrix} r_{Ai} \\ g_{Ai} \\ b_{Ai} \end{pmatrix} + k2(i,j) \begin{pmatrix} r_{Bj} \\ g_{Bj} \\ b_{Bj} \end{pmatrix} + k3(i,j) \begin{pmatrix} r_{Cij} \\ g_{Cij} \\ b_{Cij} \end{pmatrix}$$

$$= K(i,j)M(i,j)$$

$$K(i,j) = (k1(i,j), k2(i,j), k3(i,j)) \quad (5b)$$

$$M(i,j) = \begin{pmatrix} V_{Ai} \\ V_{Bj} \\ V_{Cij} \end{pmatrix} = \begin{pmatrix} r_{Ai} & g_{Ai} & b_{Ai} \\ r_{Bj} & g_{Bj} & b_{Bj} \\ r_{Cij} & g_{Cij} & b_{Cij} \end{pmatrix} \quad (5c)$$

As described later in detail, mask data representing a mask are prepared based on coefficients k1(i,j) for the first color vector $V_{Ai}$ regarding the subject color. When either one of the first color vector $V_{Ai}$ and the second color vector $V_{Bj}$ coincides with the third color vector $V_{Cij}$ in each basis, the three color vectors are not linearly independent. Under such conditions, an arbitrary color can not be expressed by the three color vectors $V_{Ai}$, $V_{Bj}$ and $V_{Cij}$. When either the first color vector $V_{Ai}$ or the second color vector $V_{Bj}$ is fairly close to the third color vector $V_{Cij}$, the coefficient k1(i,j) for the first color vector $V_{Ai}$ may become excessively large or small. At step S13 in the flowchart of FIG. 5, it is determined whether either one of the first color vector $V_{Ai}$ and the second color vector $V_{Bj}$ in each set is too close to the unit white vector $$V_{WH}\left(\frac{1}{\sqrt{3}}, \frac{1}{\sqrt{3}}, \frac{1}{\sqrt{3}}\right).$$

When either of the color vectors $V_{Ai}$ and $V_{Bj}$ is too close to the unit vector $V_{WH}$, the program proceeds to step S14 at which a vector other than the unit white vector $V_{WH}$ is set as the third color vector $V_{Cij}$.

In concrete procedures of step S13, the first color vector $V_{Ai}$ and the second color vector $V_{Bj}$ are transformed to vectors in the HSV coordinate system (hue/saturation/brightness coordinate system) according to Equations (2a)–(2e) stated above.

Equations (2a)–(2e) give a hue H, a saturation S, and a brightness V for each of the first color vector $V_{Ai}(r_{Ai},g_{Ai},b_{Ai})$ and the second color vector $V_{Bj}(r_{Bj},g_{Bj},b_{Bj})$.

When at least one of the first color vector $V_{Ai}$ and the second color vector $V_{Bj}$ is too close to the unit white vector $V_{WH}$, the program proceeds to step S14 at which a vector other than the unit white vector $V_{WH}$ is set as the third color vector $V_{Cij}$.

The third color vector $V_{Cij}$ thus obtained is linearly independent of the first color vector $V_{Ai}$ and the second color vector $V_{Bj}$, so that each set of the three color vectors $V_{Ai}$, $V_{Bj}$, and $V_{Cij}$ can be used as a basis for representing colors in the color space. In other words, any color in the RGB space is expressed as a linear combination of the three color vectors $V_{Ai}$, $V_{Bj}$, and $V_{Cij}$ as given by Equations (1a)–(1c) stated above. The third color vector $V_{Cij}$ is specified by rotating the hue of the first color vector $V_{Ai}$ or the second color vector $V_{Bj}$ as shown in FIG. 9, and the third color vector $V_{Cij}$ accordingly represents a real color. Since the three color vectors $V_{Ai}$, $V_{Bj}$, and $V_{Cij}$ respectively represent real colors, coefficients k1(i,j), k2(i,j), and k3(i,j) for these color vectors thus actually give a mixing ratio of the three real colors.

The third color vector $V_{Cij}$ can be set to be linearly independent of the first color vector $V_{Ai}$ and the second color vector $V_{Bj}$ by a variety of methods other than the above process. For example, a cross product $V_{Ai} \times V_{Bj}$ of the first and the second color vectors $V_{Ai}$ and $V_{Bj}$ can be set as the third color vector $V_{Cij}$. In this case, however, the cross product $V_{Ai} \times V_{Bj}$ may not represent a real color and the coefficients k1, k2, and k3 for the respective color vectors do not accordingly have actual significance. It is thus preferable to determine the third color vector by rotating the hue of the first color vector or the second color vector as described above.

In the description below, each basis defined by the three color vectors $V_{Ai}$, $V_{Bj}$, and $V_{Cij}$ is referred to as "basis BB(i,j)".

After the third color vector $V_{Cij}$ is determined as above, the program proceeds to step S15 in the flowchart of FIG. 5, at which the matrix operation unit 50 prepares a 3×3 matrix M(i,j) according to Equation (5c), consisting of the components of the three color vectors $V_{Ai}$, $V_{Bj}$, and $V_{Cij}$ of each basis BB(ij), and stores the 3×3 matrix M(i,j) in the matrix memory 26.

A set of coefficients K(i,j) for an arbitrary color E(Re,Ge,Be) is given by the following Equation (6):

$$K(i,j)=EM(i,j)^{-1} \quad (6)$$

The set of coefficients K(i,j) can be determined by multiplying the color data E(Re,Ge,Be) by an inverse $M(i,j)^{-1}$ of the matrix M(i,j). Therefore, at step S16, the matrix operation unit 50 calculates the inverse matrices $M(i,j)^{-1}$ for the 'n×m' sets of bases BB(i,j) and stores the inverse matrices $M(i,j)^{-1}$ in the matrix memory 26.

Figure 20:
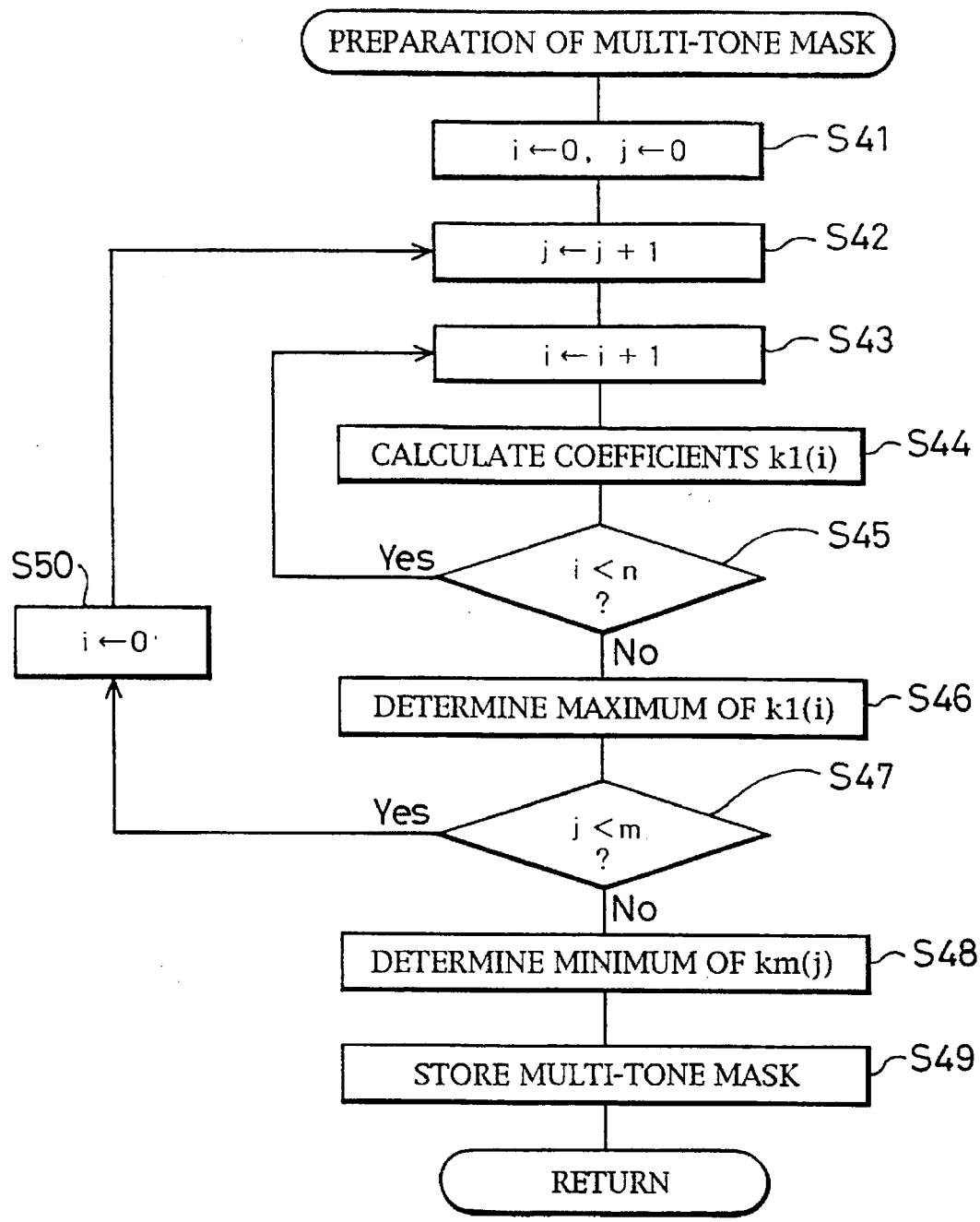
FIG. 20 is a flowchart showing a procedure of preparing a multi-tone mask in the second embodiment.

After the process of step S4 of FIG. 3 is completed, the program proceeds to step S5 to prepare a multi-tone mask. FIG. 20 is a flowchart showing a procedure of preparing a multi-tone mask in the second embodiment. The parameters 'i' and 'j' are initialized to zero at step S41 and they are respectively increased by one at steps S42 and S43.

At step S44, the multi-tone mask operation unit 52 reads out a color data E(Re,Ge,Be) of each pixel in the color image from the original image memory 22, and substitutes the color data E(Re, Ge, Be) in the right side of Equation (6) to determine a set of coefficients K(i,1) for a basis BB(i,1).

Figure 21:
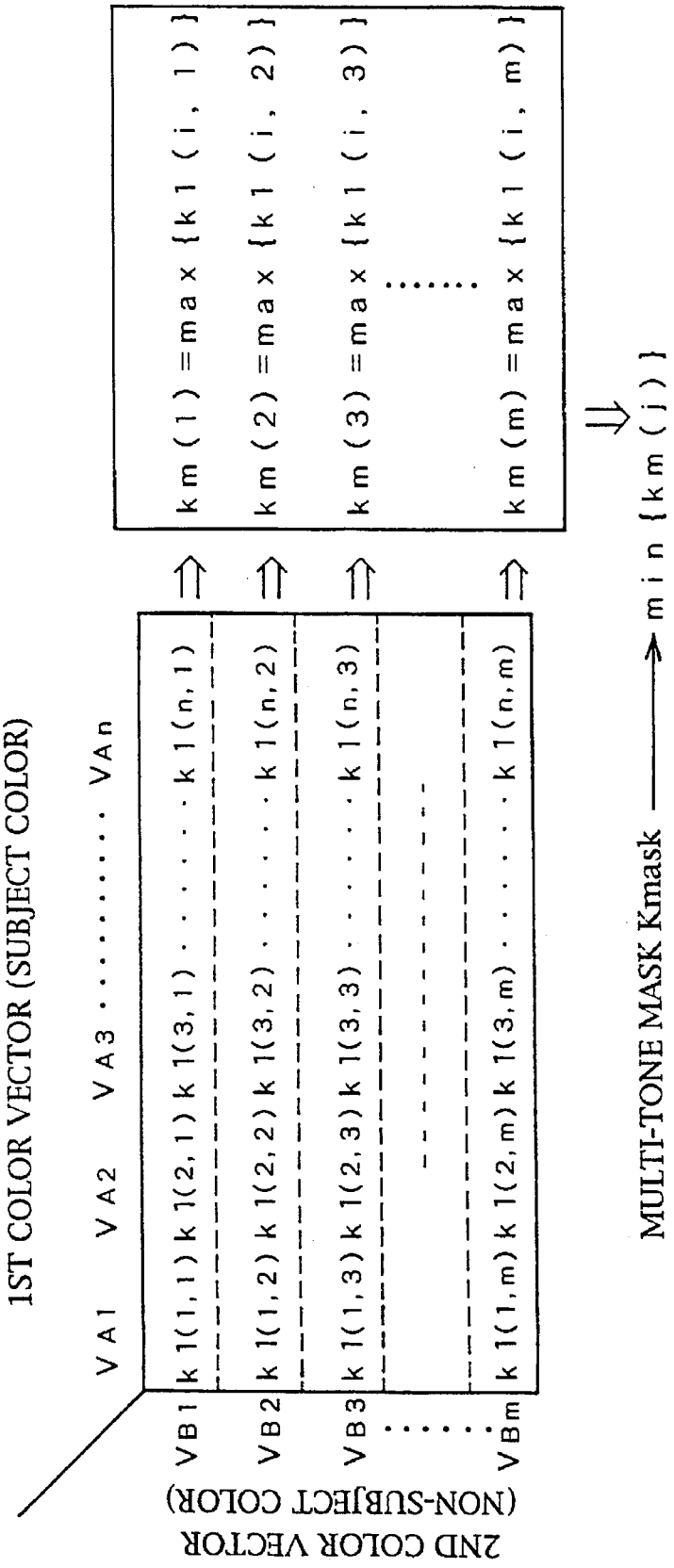
FIG. 21 shows a process of determining multi-tone mask data for one pixel value in the second embodiment.

When the parameter 'i' is no less than the number n at step S45, the program proceeds to step S46. When the parameter 'i' is less than the number n at step S45, the program returns to step S43 and repeats the processing of steps S43 and S44. The repeated procedures give n sets of coefficients K(i,1) (i=1 through n) for the n sets of bases BB(i,1) with respect to the same second color vector VB1. FIG. 21 shows a process of determining multi-tone mask data for one pixel value. The n pieces of coefficients k1(1,1) through k1(n,1) in the first row of FIG. 21 are obtained by the processing of steps S43 through S45 at j=1.

At step S46, the multi-tone mask operation unit 52 extracts the coefficients k1(1,1) through k1(n,1) for the first color vectors VAi from the n sets of coefficients K(i,1) (i=1 through n), and determines their maximum km(i)=max{k1(i,1)}.

Figure 22:
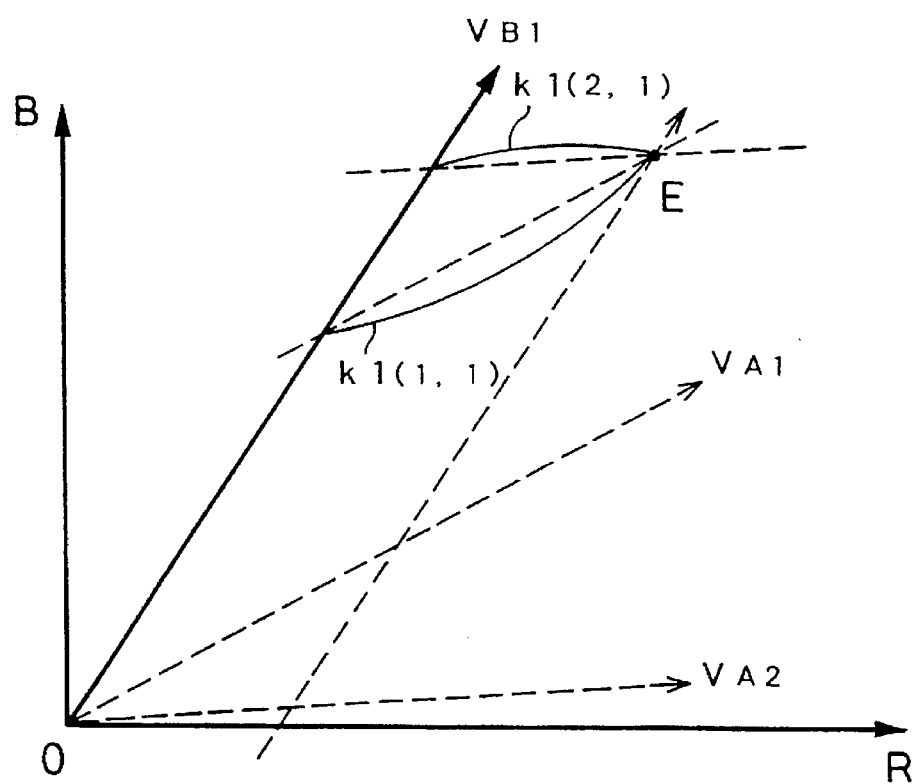
FIG. 22 shows the reason for determining a maximum $km(i)=\max\{kl(i,1)\}$ in the second embodiment.

FIG. 22 shows the reason why the maximum km(i)=max{k1(i,1)} is to be obtained. The first coefficient k1(i,j) represents the contribution of the first color vector VAi when the color E of each pixel is expressed by the basis BB(i,j). In other words, the greater the contribution of the first color vector VAi to the color data E of the pixel, the larger the first coefficient k1(i,1). In the example of FIG. 22, two coefficients k1,(1,1) and k1(2,1) are obtained with respect to one second color vector VB1. The first color vector VA1 having the greater coefficient k1(1,1) is closer to the color E of the pixel than the other first color vector VA2. When a plurality of subject colors are specified in the second embodiment, the maximum km(i)=max{k1(i,1)} among the n pieces of coefficients k1(i,1) (i=1 through n) with respect to the identical second color vector VB1 will be the one which is obtained with the basis BB including the subject color vector closest to the color E of the pixel.

When the maximum km(1) of the first coefficients is determined at j=1, it is judged whether or not the parameter 'j' is less than the number m at step S47. When 'j' is no less than m, the program proceeds to step S48. When 'j' is less than m, the program goes to step S50 at which the parameter 'i' is reset to zero and the processing of steps S42 through S47 is repeated.

When the maximum km(j) (j=1 through m) of the first coefficients is determined for each value of the parameter j (j=1 through m), the program goes to step S48 at which a minimum value min{km(j)} among the m pieces of maximum values km(j) is determined and to step S49 at which the minimum value min{km(j)} is stored as multi-tone mask data kmask in the multi-tone mask memory 28 (FIG. 21).

Figure 23:
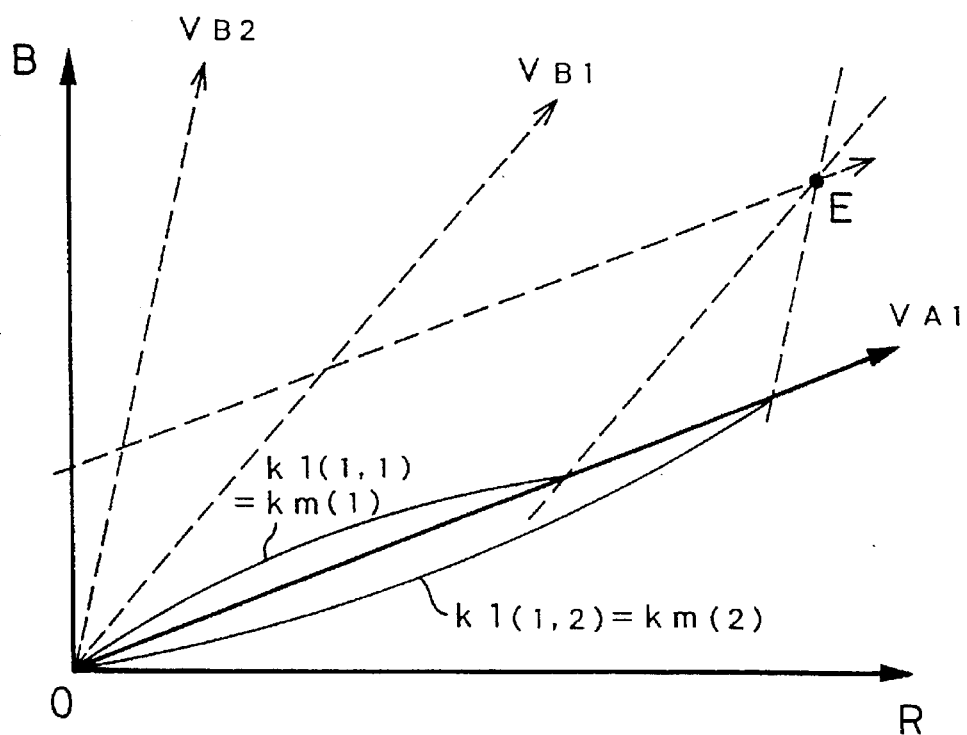
FIG. 23 shows the reason for applying a minimum $\min\{km(j)\}$ as multi-tone mask data in the second embodiment.

FIG. 23 shows the reason for applying the minimum value min{km(j)} as the multi-tone mask data kmask. In the example of FIG. 23, two coefficients k1(1,1) and k1(1,2) are given for two color vectors VB1 and VB2, which are respectively combined with one first color vector VA1. It is assumed that the coefficients k1(1,1) and k1(1,2) correspond to the maximum values km(1) and km(2) obtained at step S46. As clearly shown in FIG. 23, the color E of the pixel is closer to the color defined by the righthand-side second color vector than the color defined by the lefthand-side second color VB1 vector VB2. Under such conditions, the coefficient k1(1,1) based on the second color vector VB1 having the closer color becomes smaller. When there is another second color vector which is much closer to the color E of the pixel than the second color vector VB1, the coefficient k1 further decreases. The closer the second color vector becomes to the color E of the pixel, the smaller the coefficient k1 becomes. It should be noted here that a color close to the second color vector for the non-subject color is to be excluded from the mask area. Selection of the minimum value among the first coefficients k1(1,1) and k1(1,2) for the plurality of second color vectors VB1 and VB2 as the multi-tone mask data kmask effectively excludes the colors which are close to either of the plural non-subject colors from the mask area.

According to the above procedure, the area whose color is close to the n pieces of subject colors is extracted as a mask area while excluding the area whose color is close to the m pieces of non-subject colors from the mask area through determining the maximum km of the n pieces of first coefficients k1 for one second color vector and selecting the minimum of the m pieces of maximum values km as the multi-tone mask data kmask.

The steps in the flowchart of FIG. 20 are executed for each pixel included in the color image to determine multi-tone mask data kmask for each pixel. The multi-tone mask data kmask are bit map data representing the area whose color is not close to the m pieces of non-subject colors but close to the n pieces of subject colors.

When the multi-tone mask data kmask is negative, the corresponding pixel has a color just opposite to the subject color of cut-out operation. In such cases, the multi-tone mask data kmask may be set equal to zero.

Alternatively, a value kka(=kmask/kmaska) obtained by dividing the multi-tone mask data kmask of each pixel by a multi-tone mask kmaska for the subject color (kmaska=R1/r1=G1/g1=B1/b1) can be used as final multi-tone mask data. A ratio kka of more than one may be replaced by one, and a negative ratio kka can be replaced by zero. This allows bit map data representing the multi-tone mask to be in the range of 0 through 1, thereby simplifying the steps of setting a threshold value in the binarization process described previously.

According to another modification, the three coefficients k1, k2, and k3 with respect to each pixel are normalized according to Equations (4a)–(4c) given above, and bit map data of the normalized coefficient ku1 is used as multi-tone mask data.

A negative coefficient ku1 is preferably replaced by zero. This also allows bit map data of the coefficient ku1 to be in the range of 0 through 1, thereby simplifying the steps of setting a threshold value in the binarization process described previously.

Normalization according to Equations (4a)–(4c) may be executed every time when the coefficients k1, k2, and k3 are obtained for each basis BB(i,j) at step S44 in the flowchart of FIG. 20. Alternatively, the multi-tone mask data kmask can be normalized at step S48.

After the preparation of the multi-tone mask, the program proceeds to step S6 of FIG. 3 at which a binary mask is prepared based on the multi-tone mask and to step S7 at which a subject area of cut-out operation is displayed in color.

When the mask obtained is unsatisfactory at step S8, the program returns to step S2 to repeat steps S2 through S8. This procedure is the same as the first embodiment described above.

In the first embodiment, only 'flesh tint' is specified as the first-cycle non-subject color Cnsub while yellow is specified as the first-cycle subject color Csub, and the green leave patterns are thus included in the first mask (FIG. 1(A)). According to the second embodiment, on the other hand, both 'flesh tint' and 'green' are specified as the first non-subject colors, and the first mask includes only yellow areas accordingly. Repeated execution of steps S2 through S8 in the second embodiment will make a mask including only an area whose color is very close to the subject color in the color image made up of a large number of colors.

As described above, the second embodiment easily provides a mask including an area whose color is close to n pieces of subject colors Csub while excluding colors close to m pieces of non-subject colors Cnsub by simply specifying the n pieces of subject colors Csub and m pieces of non-subject colors Cnsub.

D. Third Embodiment

Figure 24:
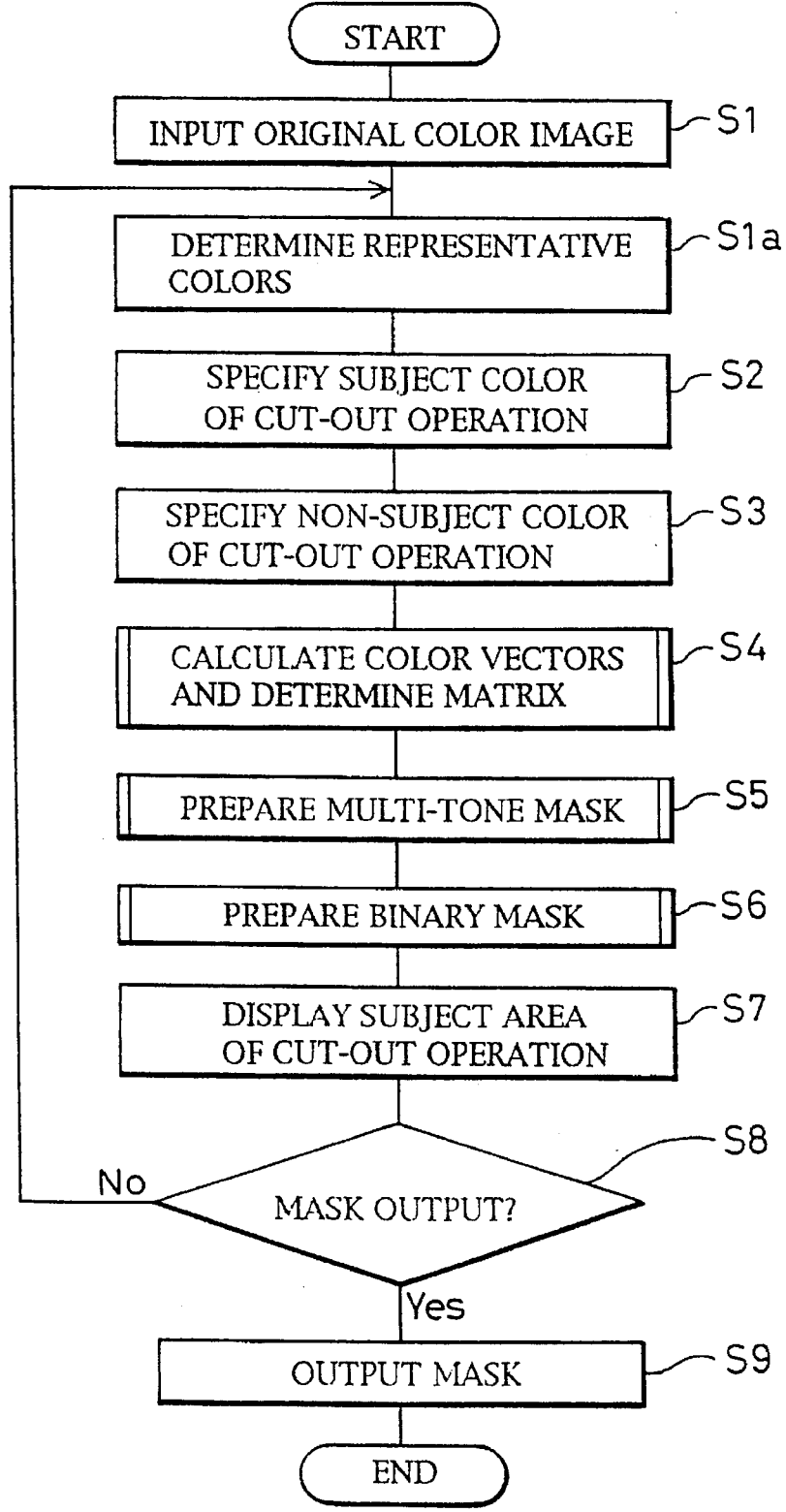
FIG. 24 is a flowchart showing a procedure of preparing a cutout mask in the third embodiment of the present invention.

FIG. 24 is a flowchart showing a procedure of preparing a cutout mask in the third embodiment of the present invention. In the third embodiment, a subject color and a non-subject color are selected from typical colors included in the color image.

The procedure of FIG. 24 is the same as that of FIG. 3 except step S1a inserted between steps S1 and S2.

Figure 25:
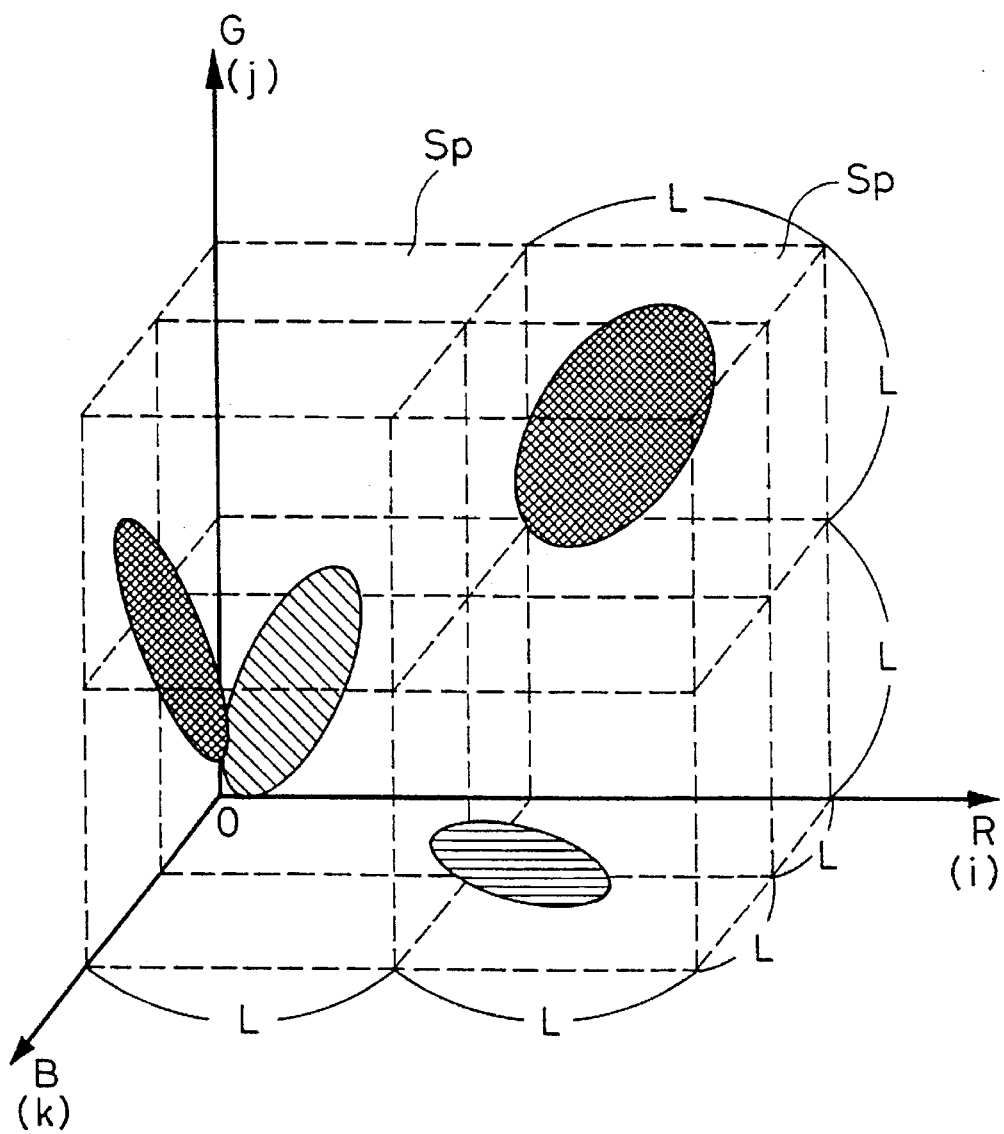
FIG. 25 shows division of the color space utilized in preparation of the color histogram.

After image data of an original color image is captured by with the scanner 36 at step S1, a color histogram is prepared by re-scanning of the original color image at step S1a. A plurality of representative colors are selected from the histogram and displayed on the color CRT 38. FIG. 25 shows division of the color space utilized in preparation of the color histogram. In the example of FIG. 25, the RGB space is partitioned by a predetermined unit length L along each coordinate axis to a plurality of cubic unit spaces Sp. At step S1a, a histogram of three-dimensional array Hst(i, j,k) is first prepared which represents the frequency of appearance of colors included in the original color image in each unit space Sp(i,j,k), where i, j, and k denote coordinates along the R, G, and B coordinate axes and have unit coordinates equal to the unit length L. For example, when each color component of R, G, and B is expressed by 255 tone levels and the unit length L is equal to 5, the i, j, and k coordinates are in the range of 0 through 51(=255/5), respectively.

Suppose that luminance (Rn, Gn, Bn) of the color components R, G, and B of an n-th pixel in the original color image is (30,120,200), the corresponding i, j, and k coordinates are respectively equal to 6(=30/5), 24(=120/5), and 40(=200/5). The value of the histogram Hst(6,24,40) is increased by one, accordingly. Mean values Rave(i,j,k), Gave(i,j,k), and Bave(i,j,k) of the respective color components in the unit space at the position of (i,j,k) are simultaneously updated according to Equations (7a)–(7c) given below:

$$R_{ave}(i,j,k) \quad \frac{H_{st}(i,j,k) \times R_{ave}(i,j,k) + R_n}{H_{st}(i,j,k) + 1} \quad (7a)$$

$$G_{ave}(i,j,k) \quad \frac{H_{st}(i,j,k) \times G_{ave}(i,j,k) + G_n}{H_{st}(i,j,k) + 1} \quad (7b)$$

$$B_{ave}(i,j,k) \quad \frac{H_{st}(i,j,k) \times B_{ave}(i,j,k) + B_n}{H_{st}(i,j,k) + 1} \quad (7c)$$

The above process is executed for all the pixels included in the original color image to determine the three-dimensional histograms Hst(i,j,k) representing the frequency of appearance of colors in each unit space and the means values Rave(i,j,k), Gave(i,j,k), and Bave(i,j,k) of the respective color components in the unit space.

The unit length L for defining the unit space is can be set to any desirable value. When the unit length L is set equal to 2 to the nth power, upper several bits of the respective R, G, and B coordinates are used as the coordinates (i,j,k) of the histogram. This reduces the time and labor required for determining the histogram with digital computers.

The above process may be executed not for all the pixels included in the original color image but for a pixel-skipped image which is obtained from the original color image. In the latter case, the re-scanning at step S1a can be replaced by skipping of image data captured at step S1.

Figure 26:
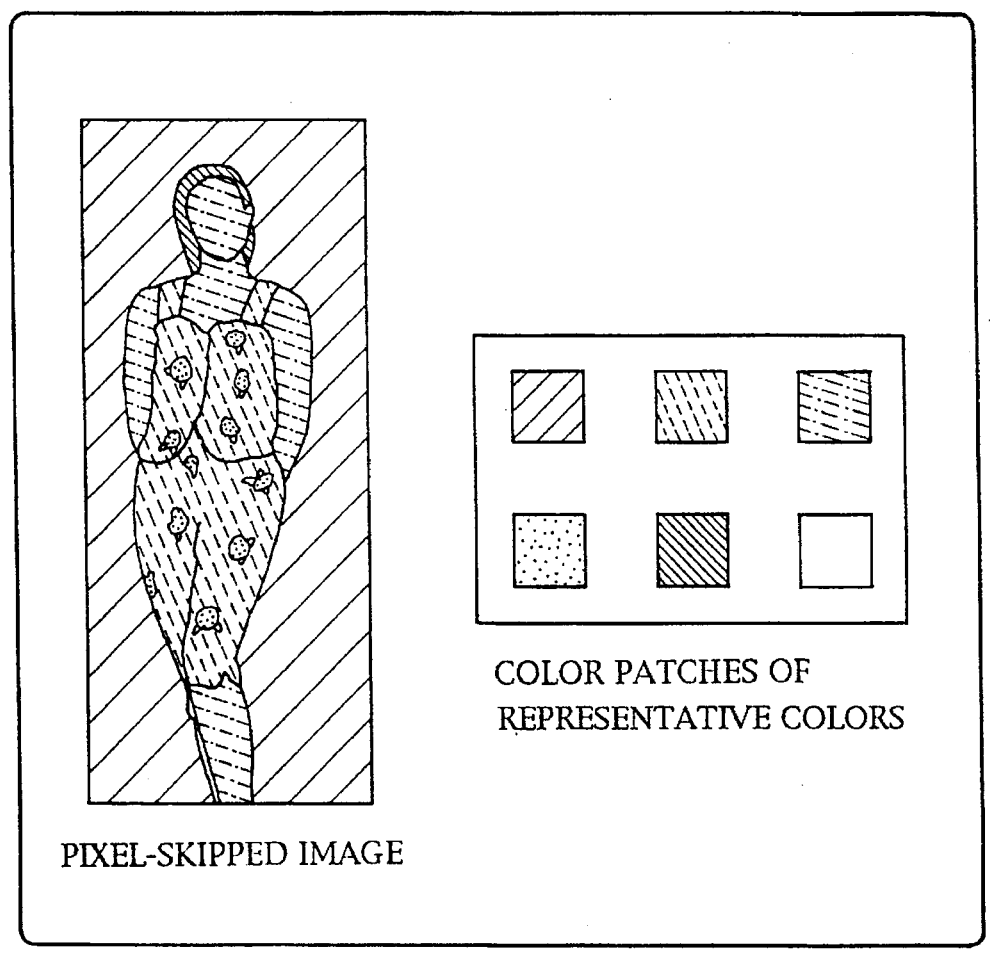
FIG. 26 shows an exemplified display of plural representative colors.

After the histograms Hst(j,j,k) and the mean color components Rave, gave, and Bave are obtained for the whole original color image, representative colors of the color image are determined from the histogram. The representative colors are the colors whose frequency of appearance in the histogram Hst(i,j,k) is equal to greater than a predetermined threshold value. Color components of the representative colors are the mean color components (Rave, Gave, Bave) at coordinates (i,j,k). The plurality of representative colors thus determined are displayed in the order of frequency of appearance on the color CRT 38. FIG. 26 shows an exemplified display of plural representative colors, where plural color patches showing the representative colors are arranged on the right half of the monitor screen and a pixel-skipped image corresponding to the original color image painted with the representative colors is displayed on the left half.

In the above process of determining and displaying the representative colors, it is not necessarily required to compare the frequency of appearance of the histogram with a threshold value to determine representative colors. In this case, mean colors of the unit spaces will be displayed in the order of frequency of appearance. This modification also allows the user to easily select representative colors having the high frequency of appearance as a subject color and a non-subject color.

At steps S2 and S3 of FIG. 24, the user selects a subject color and a non-subject color from the plurality of representative colors displayed on the color CRT 38. By way of example, the user specifies 'yellow', or the background color of the clothes shown in FIG. 1(A), as a subject color and 'flesh tint' of the model as a non-subject color. In actual procedures, the user selects a color patch representing a desirable representative color among the color patches displayed on the color CRT 38 with a pointing device such as the mouse 34. Simultaneous display of the color patches of the representative colors and a color image painted with the representative colors as shown in FIG. 26 reduces the labor and time required for specification of the subject color and the non-subject color. Since all the representative colors are originally included in the color image, the presentation of the representative colors makes the user free from possible mistakes in specification of the subject color and the non-subject color. During the specification of the subject color and the non-subject color, it is not required to display a non-skipped, original color image, but display of a pixel-skipped image painted with the representative colors is sufficient to select subject and non-subject colors from the representative colors.

Instead of calculating the mean color of each unit space, a color corresponding to a specific location in each unit space can be used as a representative color of the unit space. For example, a color corresponding to a center of each unit space or that corresponding to a specific corner of each unit space can be used as a representative color of the unit space. Calculation of mean colors in the respective unit spaces is, however, preferable since this method can determine proper colors included in the original color image as representative colors.

Figure 27:
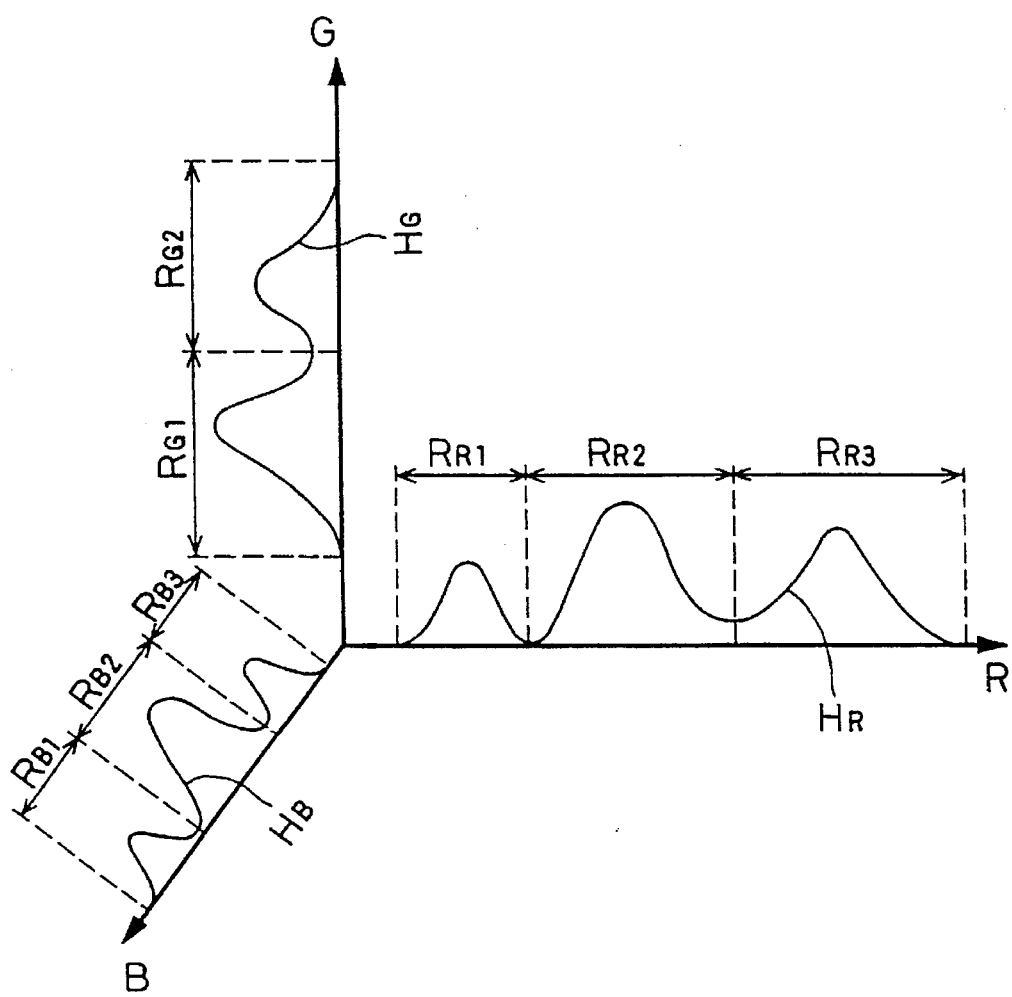
FIG. 27 shows another method of dividing the color space in the third embodiment.

Other methods can be applied to divide the color space into several sections for determination of representative colors. FIG. 27 shows another method of dividing the color space in the third embodiment. A graph HR on the R axis in FIG. 27 shows a histogram of the R component of the original color image, and a graph HG on the G axis and a graph HB on the B axis respectively denote histograms of the G and B components. As for the R component, the color space is partitioned at a bottom or local minimum of the histogram HR along the R axis into three regions RR1, RR2, and RR3 in the example of FIG. 27. The color space is also partitioned at bottoms of the respective histograms HG and HB for G and B the components. When the histogram of the R component is prepared first, for example, a histogram of the G component is prepared in each partition of the color space on the R axis, and a histogram of the B component is then prepared in each partition of the color space on the R and G axes. Upon condition that only one peak exists in a histogram, it is not required to divide color component axis of the corresponding color component. Partition of the coordinate axes of the respective color components results in dividing the three-dimensional color space into several sections. The frequency of appearance of colors and the mean color of each space section are calculated in the same manner as described above. The mean color of the space section where the frequency of appearance is equal to or greater than a predetermined threshold value is specified as a representative color.

This alternative method defines space sections applied to determination of representative colors by dividing the color space in the vicinity of the bottom or local minimum of the histogram of each color component. This method can appropriately divide the color space into several sections according to characteristics of the original color image.

An arbitrary coordinates system of three linearly independent coordinate axes other than the R, G, and B axes can be used for the division of the color space. For example, three primary color components of the original color image can be used as coordinate axes for dividing the color space.

The explanation of steps S2 through S9 of FIG. 24 are omitted here because they are executed in the same manner as in the first embodiment. The selection of a subject color and a non-subject color according to the third embodiment can be also applied to the second embodiment where a plurality of subject colors or a plurality of non-subject colors are specified.

E. Fourth Embodiment

Figure 28:
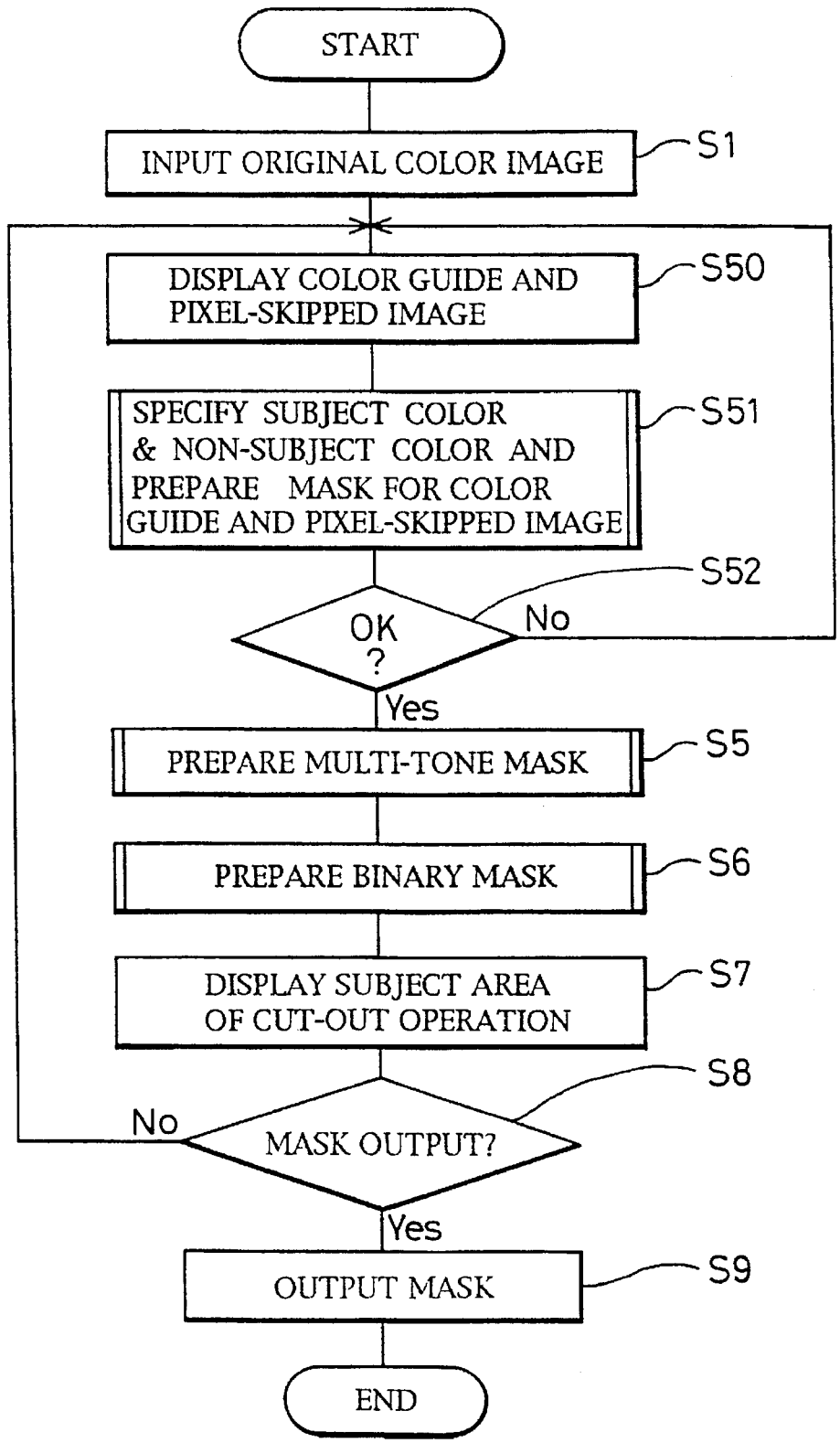
FIG. 28 is a flowchart showing a procedure of preparing a cutout mask in the fourth embodiment of the present invention.

FIG. 28 is a flowchart showing a procedure of preparing a cutout mask in the fourth embodiment of the present invention. In the fourth embodiment, a subject color and a non-subject color are specified using a color guide or color picker.

The procedure of FIG. 28 is the same as that of FIG. 3 except steps S2 through S4 of FIG. 3 are replace by steps S50 through S52.

Figure 29:
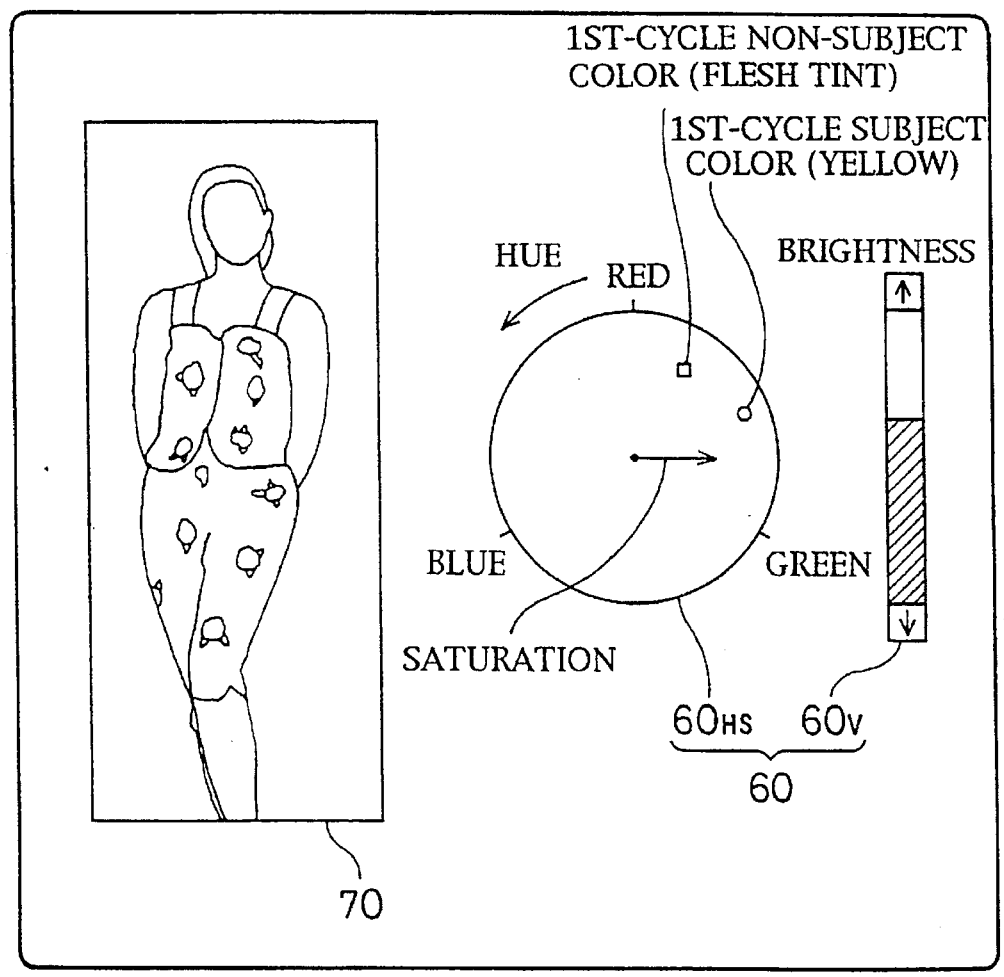
FIG. 29 is a plan view illustrating a color guide 60 and a pixel-skipped image 70.

After image data of an original color image is captured by with the scanner 36 at step S1, a color guide and a pixel-skipped image produced from the original color image are displayed on the color CRT 38 at step S50. FIG. 29 is a plan view illustrating a color guide 60 and a pixel-skipped image 70 thus displayed. The color guide 60, or a color picker, is a color selection image for selecting a desired color. The color guide 60 shown in FIG. 29 includes a circular graph 60HS representing the hue and saturation and a bar graph 60v representing the brightness. Each pixel in the hue/saturation graph 60HS is filled with a color having specific hue and saturation according to the position of the pixel. The hue is defined by the counterclockwise angle from the reference color 'red', and the saturation by the radial distance from the center of the circle. The brightness is expressed by the height in the brightness graph 60v. A desired combination of hue, saturation, and brightness is specified by selecting one dot in the hue/saturation graph 60HS and designating a height in the brightness graph 60v.

Any color selection image instead of the color guide 60 shown in FIG. 29 can be used for selecting an arbitrary color to specify a subject color and a non-subject color.

Figure 30:
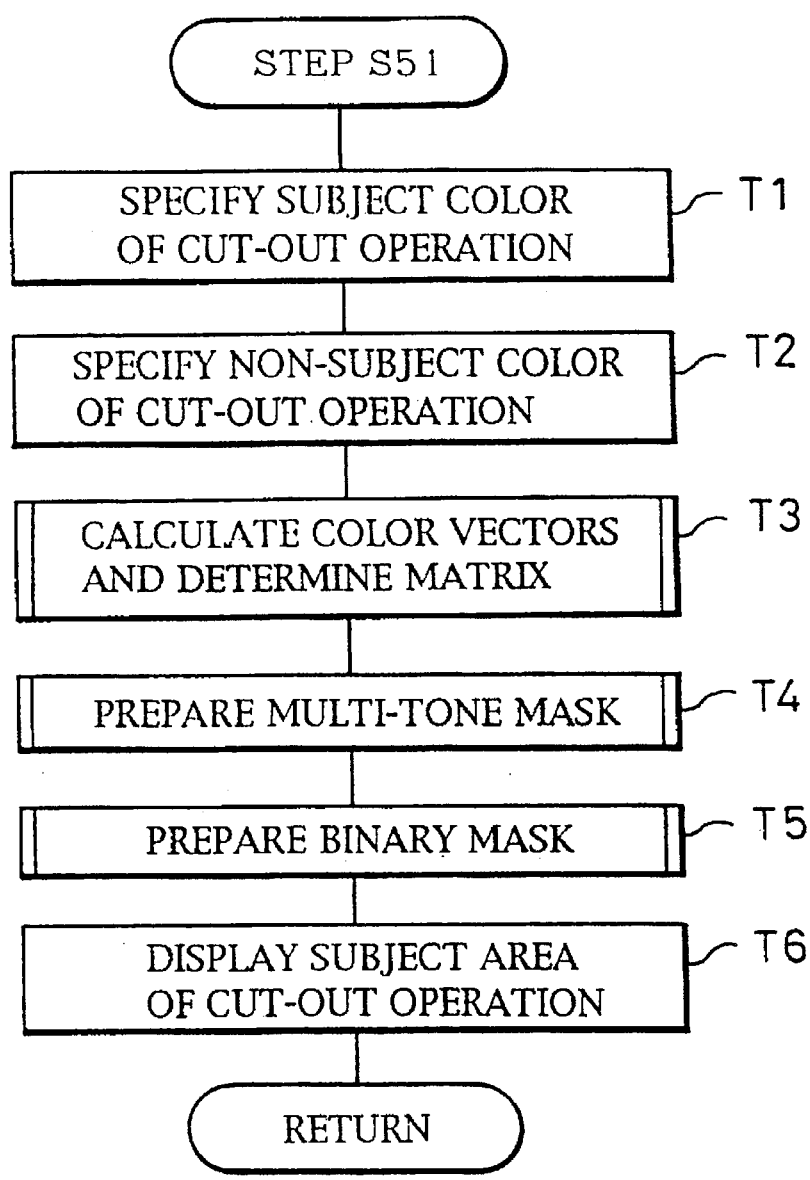
FIG. 30 is a flowchart showing details of the processing executed at step S51.

At step S51 of FIG. 28, the user specifies a subject color and a non-subject color of mask preparation, and the CPU 20 produce a mask for the color guide 60 and the pixel-skipped image 70 accordingly. FIG. 30 is a flowchart showing details of the processing executed at step S51. the procedure of FIG. 30 is the same as steps S2 through S7 of FIG. 3, but it is directed to the preparation of a mask for the color guide 60 and the pixel-skipped image 70.

At steps T1 and T2, the user specifies a subject color and a non-subject color by using the color guide 60 displayed on the color CRT 38. The user can specify the subject color and the non-subject color by selecting one dot in the hue/saturation graph 60HS and designating a height in the brightness graph 60v both displayed on the color CRT 38 with a pointing device, such as the mouse 34. The dots specified in the hue/saturation graph 60HS to represent the subject color and the non-subject color are preferably painted with predetermined colors, for example, white and/or black. This clearly shows the user the subject color and the non-subject color specified. Alternatively, the dots representing the subject color and the non-subject color may be shown with an identical color but in different shapes. It is also preferable that bars representing the brightness levels of the subject color and the non-subject color are filled with different colors.

Since a combination of the subject color and the non-subject color is determined by repeatedly executing the process of steps S50 through S52 of FIG. 28, the subject color and the non-subject color specified at steps T1 and T2 of step S51 are only possible alternatives of the final subject color and non-subject color until the user gives an approval at step S52 as described later. The subject color and the non-subject color finally determined by the repetition of steps S50 through S52 will be the final 'first-cycle subject color' and the final 'first-cycle non-subject color'.

Steps T3 through T5 are executed in the same manner as steps S4 through S6 of FIG. 3 in the first embodiment.

Figure 31:
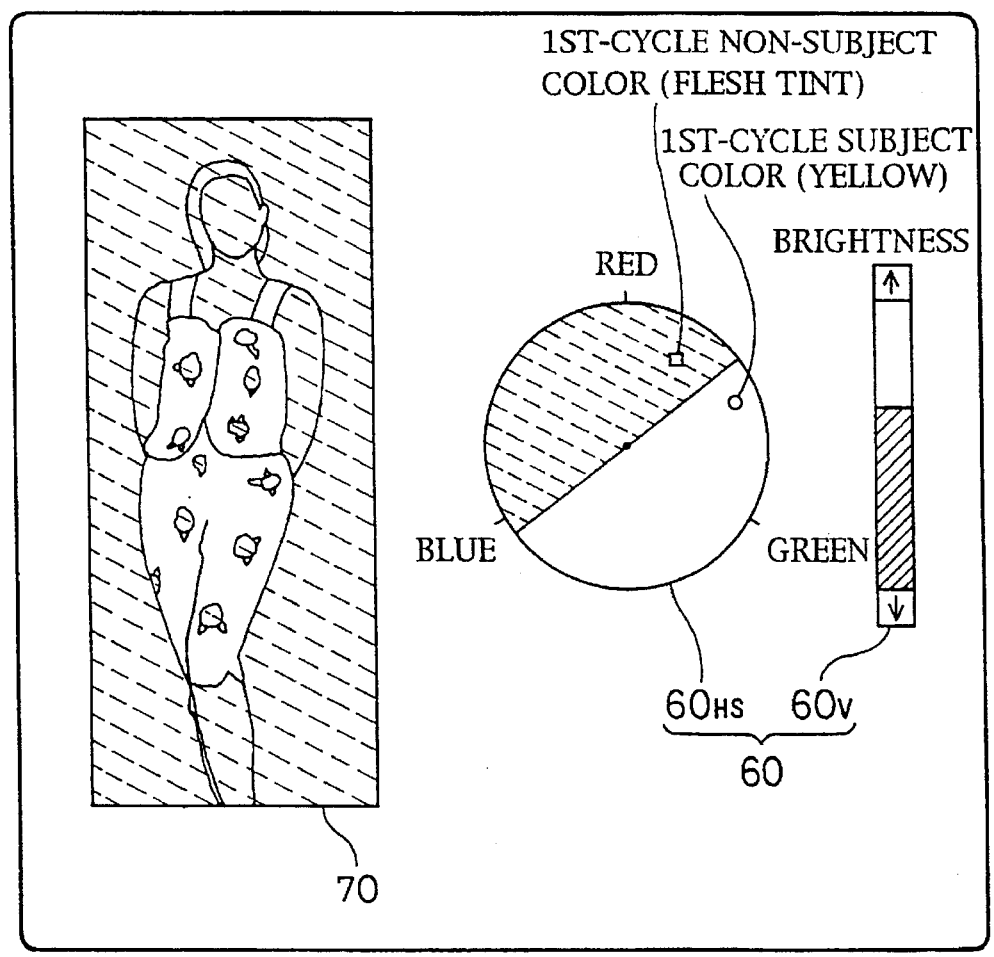
FIG. 31 illustrates a subject area and a non-subject area displayed in the hue-saturation graph 60HS and the pixel-skipped image 70 in the fourth embodiment.

After binary masks for the color guide 60 and the pixel-skipped image 70 are prepared at step T5, the binary mask data are combined with image data of the hue/saturation graph 60HS and those of the pixel-skipped image 70 at step T6, and a subject area of cut-out operation is displayed on the color CRT 38 as a function of the combined data. FIG. 31 illustrates a subject area and a non-subject area of cut-out operation both in the hue-saturation graph 60HS and the pixel-skipped image 70. In FIG. 31, the non-subject area is hatched with broken lines and actually displayed in gray while the subject area is not hatched and actually displayed in color. Any method other than that described above can be applied to distinguish the subject area of cut-out operation, or mask area, from the non-subject area. For example, the non-subject area can be displayed in black and white.

Although the subject area and the non-subject area of cut-out operation are displayed both in the hue/saturation graph 60HS and the pixel-skipped image 70 in FIG. 31, the subject area may be shown only in either one of the hue/saturation graph 60HS and the pixel-skipped image 70. In the latter case, preparation of the multi-tone mask and the binary mask at steps T4 and T5 of FIG. 30 are executed only for the image in which the subject area and the non-subject area are to be shown.

The user checks the subject area displayed on the color CRT 38 and determines whether a desirable mask is obtained at step S52 of FIG. 28. When the prepared mask is satisfactory, the program proceeds to step S5. When the mask prepared is unsatisfactory, the program returns to step S50 and repeats the processing of steps S50 and S51. The subject color and the non-subject color finally determined by repeated execution of steps S50 through S52 will become the final 'first-cycle subject color' and the final 'first-cycle non-subject color'.

After the first-cycle subject color and the first-cycle non-subject color are specified, the program proceeds to step S5 at which a multi-tone mask is prepared for the original color image, and to step S6 at which a binary mask is prepared for the original color image. The matrix M obtained at step S51 for the first-cycle subject color and the first-cycle non-subject color is applied to the non-skipped, original color image. The processing executed at step S5 is equivalent to that of step T4 of FIG. 30, and the processing executed at step S6 is equivalent to that of step T5. Whereas only a relatively short time is required for the processing of steps T4 and T5 with respect to the color guide 60 and the pixel-skipped image 70, the processing of steps S5 and S6 for the non-skipped, original color image requires a relatively long time. Therefore the determination of the subject color and the non-subject color through the repetition of steps S50 through S52 will shorten the whole processing time, compared with repetition of steps S2 through S8 of FIG. 3 in the first embodiment.

The explanation of steps S7 through S9 of FIG. 28 are omitted here because they are executed in the same manner as in the first embodiment. The selection of a subject color and a non-subject color according to the fourth embodiment can be also applied to the second embodiment where a plurality of subject colors or a plurality of non-subject colors are specified.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of generating mask data representing a desired color area in a color image, said method comprising the steps of:
   (a) specifying n pieces of subject colors and m pieces of non-subject colors for defining said desired color area, where m and n are integers;
   (b) obtaining n pieces of first color vectors for said n pieces of subject color in a color space;
   (c) obtaining m pieces of second color vectors for said m pieces of non-subject colors in said color space;
   (d) forming n×m combinations of said first and second color vectors, and obtaining a third color vector linearly independent of the first and second color vectors with respect to each of said n×m combinations to form n×m sets of bases composed of said first through third color vectors;
   (e) expressing color of each pixel included in said color image by a linear combination of said first through third color vectors with respect to each of said n×m sets of bases, to thereby obtain first through third coefficients for said first through third color vectors with respect to each of said n×m sets of bases; and
   (f) generating said mask data as a function of said first coefficient obtained with respect to each of said n×m sets of bases.

2. A method in accordance with claim 1, wherein said step (d) comprises the steps of:
   transforming each of said m×n combinations of said first and second color vectors to fourth and fifth color vectors in a hue/saturation/brightness space; and
   selecting a vector representing white in said color space as said third color vector when saturation components of said fourth and fifth color vectors are more than a predetermined value; and when a saturation component of at least one of said fourth and fifth color vectors is less than said predetermined value, rotating a hue component of one said fourth and fifth color vectors, whose saturation component is the greater, by a predetermined angle in said hue/saturation/brightness space to generate a sixth color vector and transforming said sixth color vector into said color space to generate said third color vector.

3. A method in accordance with claim 2, wherein each of said m and n is equal to one.

4. A method in accordance with claim 3, wherein said step (f) comprise the step of:
   binarizing said first coefficient with a threshold value to generate binary mask data.

5. A method in accordance with claim 2, further comprising the steps of:
   (g) displaying a mask area represented by said mask data distinguishably from a non-mask area in said color image on a display device; and
   (i) executing the processing of said steps (a) through (g) on said mask area in said color image while specifying n' pieces of subject colors and m' pieces of non-subject colors at said step (a), to thereby generate second mask data representing a second mask area within said mask area.

6. A method in accordance with claim 5, wherein each of said m, m', n and n' is equal to one.

7. A method in accordance with claim 2, wherein said step (f) comprises the step of:
   determining a value of said mask data for each pixel in said color image by the steps of:
   (1) determining a maximum of n pieces of first coefficients with respect to each pixel in said color image, said n pieces of first coefficients being obtained with respect to n pieces of bases which include an identical one of said m pieces of second color vectors, to thereby obtain m pieces of said maximums for said m pieces of second color vectors;
   (2) determining a minimum of said m pieces of said maximums with respect to each pixel in said color image; and
   (3) determining said value of said mask data for each pixel in said color image as a function of said minimum of said m pieces of said maximums.

8. A method in accordance with claim 3, wherein said step (3) comprises the step of:
   binarizing said minimum with a threshold value to generate binary mask data.

9. A method in accordance with claim 8, wherein said step of binarizing comprises the steps of:
   preparing a histogram showing frequency of said minimum in said color image; and
   determining a local minimum of said histogram as said threshold value.

10. A method in accordance with claim 2, wherein said step (a) comprises the steps of:
    (1) obtaining statistical color distribution of said color image;
    (2) determining a plurality of representative colors of said color image from said statistical color distribution, and displaying said plurality of representative colors on a display device; and
    (3) selecting said n pieces of subject colors and said m pieces of non-subject colors from said plurality of representative colors displayed on said display device.

11. A method in accordance with claim 10, wherein said step (1) comprises the step of:

dividing said color space into a plurality of divisional spaces; and obtaining a frequency of each of said plurality of divisional spaces within said color images as said statistical color distribution; and wherein said step (2) comprises the steps of:

displaying said plurality of representative colors corresponding to at least part of said plurality of divisional spaces according to said frequency.

12. A method in accordance with claim 11, wherein said step of dividing said color space comprises the steps of:

obtaining three histogram for three color components of said color space concerning said color image; and finding local minimums for said three histograms, and setting said local minimums as borders of said plurality of divisional spaces.

13. A method in accordance with claim 2, wherein said step (a) comprises the steps of:

displaying a color selection image for selecting arbitrary color components on a display device; and specifying said n pieces of subject colors and said m pieces of non-subject colors while using said color selection image.

14. A method in accordance with claim 13, further comprising, between said steps (d) and (e), the steps of:

(1) selecting at least one of said color selection image and a pixel-skipped image of said color image as a subject image;

(2) expressing color of each pixel included in said subject image by a linear combination of said first through third color vectors with respect to each of said n×m sets of bases, to thereby obtain first through third coefficients for said first through third color vectors with respect to each of said n×m sets of bases;

(3) generating preliminary mask data as a function of said first coefficient obtained with respect to each of said n×m sets of bases in said step (2) for each pixel included in said subject image; and (4) displaying a preliminary mask area represented by said preliminary mask data distinguishably from a preliminary non-mask area in said subject image on said display device.

15. A method in accordance with claim 14, further comprising the step of:

repeatedly executing the processing of said steps (a) through (d) and (1) through (4) in response to a demand from a user while re-selecting said n pieces of subject colors and said m pieces of non-subject colors at said step (a).

16. A method in accordance with claim 15, wherein each of said m and n is equal to one.

17. An apparatus for generating mask data representing a desired color area in a color image, said apparatus comprising:

means for specifying n pieces of subject colors and m pieces of non-subject colors for defining said desired color area, where m and n are integers;

means for obtaining n pieces of first color vectors for said n pieces of subject color in a color space;

means for obtaining m pieces of second color vectors for said m pieces of non-subject colors in said color space;

means for forming n×m combinations of said first and second color vectors, and obtaining a third color vector linearly independent of the first and second color vectors with respect to each of said n×m combinations to form n×m sets of bases from said first through third color vectors;

means for expressing color of each pixel included in said color image by a linear combination of said first through third color vectors with respect to each of said n×m sets of bases, to thereby obtain first through third coefficients for said first through third color vectors with respect to each of said n×m sets of bases;

means for generating said mask data as a function of said first coefficient obtained with respect to each of said n×m sets of bases.

18. An apparatus in accordance with claim 17, wherein each of said m and n is equal to one.

19. An apparatus in accordance with claim 17, wherein said means for specifying colors comprises:

means for obtaining statistical color distribution of said color image;

means for determining a plurality of representative colors of said color image from said statistical color distribution, and displaying said plurality of representative colors on a display device; and means for selecting said n pieces of subject colors and said m pieces of non-subject colors from said plurality of representative colors displayed on said display device.

20. An apparatus in accordance with claim 17, wherein said means for specifying colors comprises:

means for displaying a color selection image for selecting arbitrary color components on a display device; and means for specifying said n pieces of subject colors and said m pieces of non-subject colors while using said color selection image.

* * * * *